(12) United States Patent
Kato

(10) Patent No.: US 6,662,459 B2
(45) Date of Patent: Dec. 16, 2003

(54) ELECTRONIC AZIMUTH METER AND TIMEPIECE

(75) Inventor: Kazuo Kato, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/916,525

(22) Filed: Jul. 27, 2001

(65) Prior Publication Data

US 2002/0023362 A1 Feb. 28, 2002

(51) Int. Cl.[7] ............................................. G01C 17/38
(52) U.S. Cl. ............................................. 33/356; 33/357
(58) Field of Search ............................. 33/356, 355 R, 33/357, 361, 358, 359

(56) References Cited

U.S. PATENT DOCUMENTS

| | | | | |
|---|---|---|---|---|
| 2,955,357 A | * | 10/1960 | Uebelhardt | 33/356 |
| 4,143,467 A | * | 3/1979 | Erspamer et al. | 33/356 |
| 4,402,142 A | * | 9/1983 | Dinsmore | 33/348 |
| 4,413,424 A | * | 11/1983 | Sasaki et al. | 33/356 |
| 4,472,682 A | | 9/1984 | Kuno et al. | 324/228 |
| 4,668,100 A | * | 5/1987 | Murakami et al. | 33/354 |
| 4,887,003 A | * | 12/1989 | Parker | 313/634 |
| 5,216,816 A | * | 6/1993 | Ida | 33/356 |
| 5,269,065 A | * | 12/1993 | Ida | 33/269 |
| 5,632,092 A | * | 5/1997 | Blank et al. | 324/252 |
| 5,644,851 A | | 8/1997 | Blank et al. | 33/361 |
| 5,850,624 A | * | 12/1998 | Gard et al. | 33/356 |
| 6,385,133 B1 | * | 5/2002 | Miyauchi | 368/10 |
| 6,427,349 B1 | * | 8/2002 | Blank et al. | 33/356 |
| 2002/0014016 A1 | * | 2/2002 | Kato | 33/355 R |

FOREIGN PATENT DOCUMENTS

| | | |
|---|---|---|
| JP | 58-225309 | 12/1983 |
| JP | 11-044538 | 2/1999 |
| WO | WO 99/67596 | 12/1999 |

\* cited by examiner

*Primary Examiner*—Christopher W. Fulton
*Assistant Examiner*—Amy R. Cohen
(74) *Attorney, Agent, or Firm*—Adams & Wilks

(57) ABSTRACT

A method for adjusting an electronic azimuth meter comprising the steps of performing a magnetic field generating sequence by generating a sequence of magnetic fields used for adjusting the electronic azimuth meter, the sequence of magnetic fields commencing with generation of a strong magnetic field having a magnitude larger than that of the Earth's geomagnetism, and providing, within the strong magnetic field, an electronic azimuth meter having a magnetic detector and a control unit for performing a data acquisition and adjustment process in response to detection of the strong magnetic field, so that the control unit commences the data acquisition and adjustment process when the strong magnetic field is detected and the electronic azimuth meter is not electrically connected to a magnetic field generating apparatus which generates the sequence of magnetic fields.

18 Claims, 12 Drawing Sheets

FIG. 2A
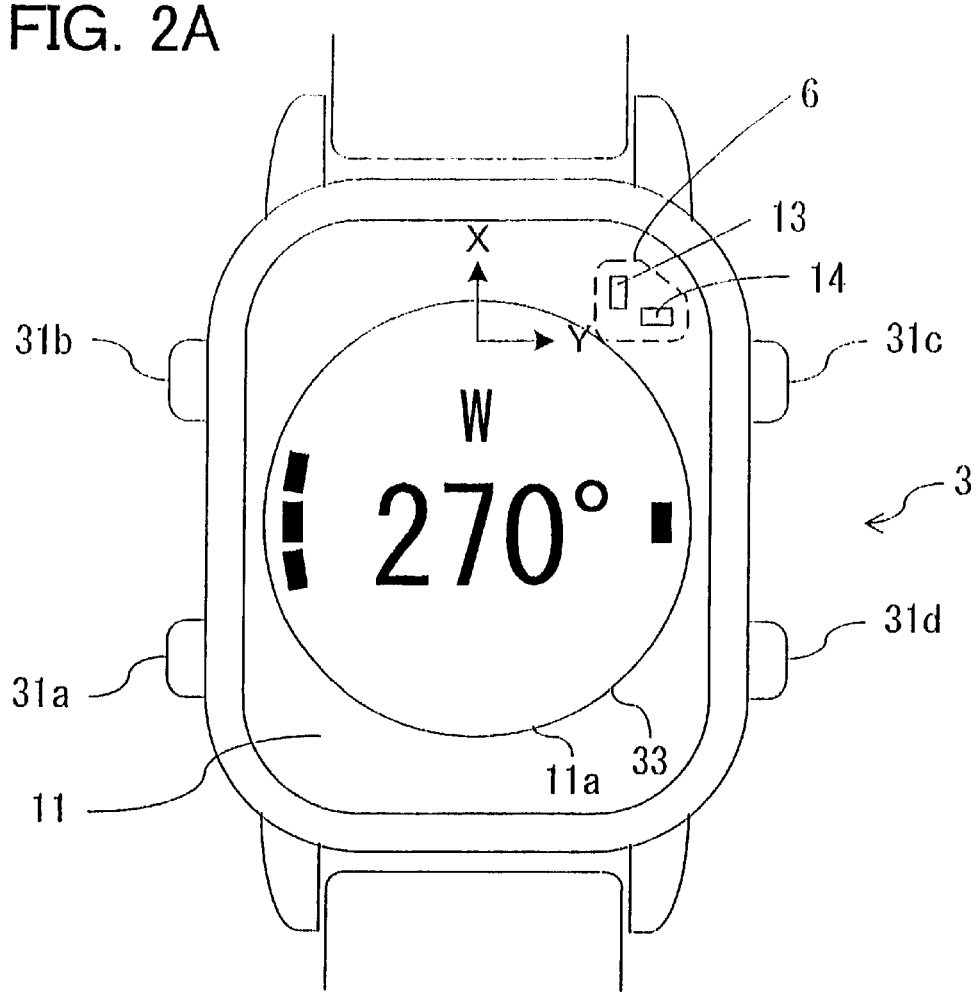
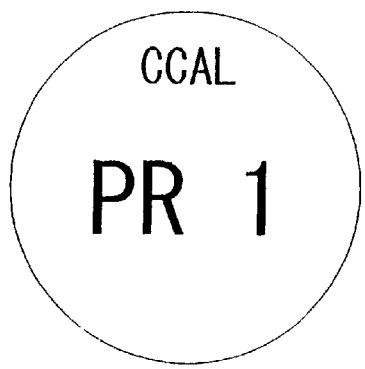
DISPLAY IN ADJUSTMENT
FIG. 2B
DISPLAY AFTER ADJUSTMENT
FIG. 2C
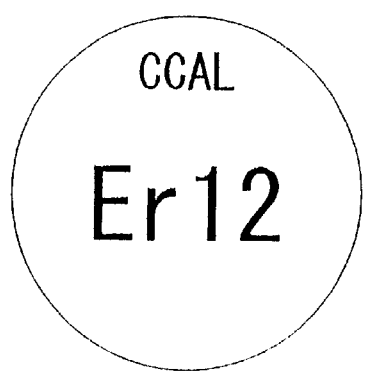
DISPLAY AT INTERRUPTED ADJUSTMENT
FIG. 2D

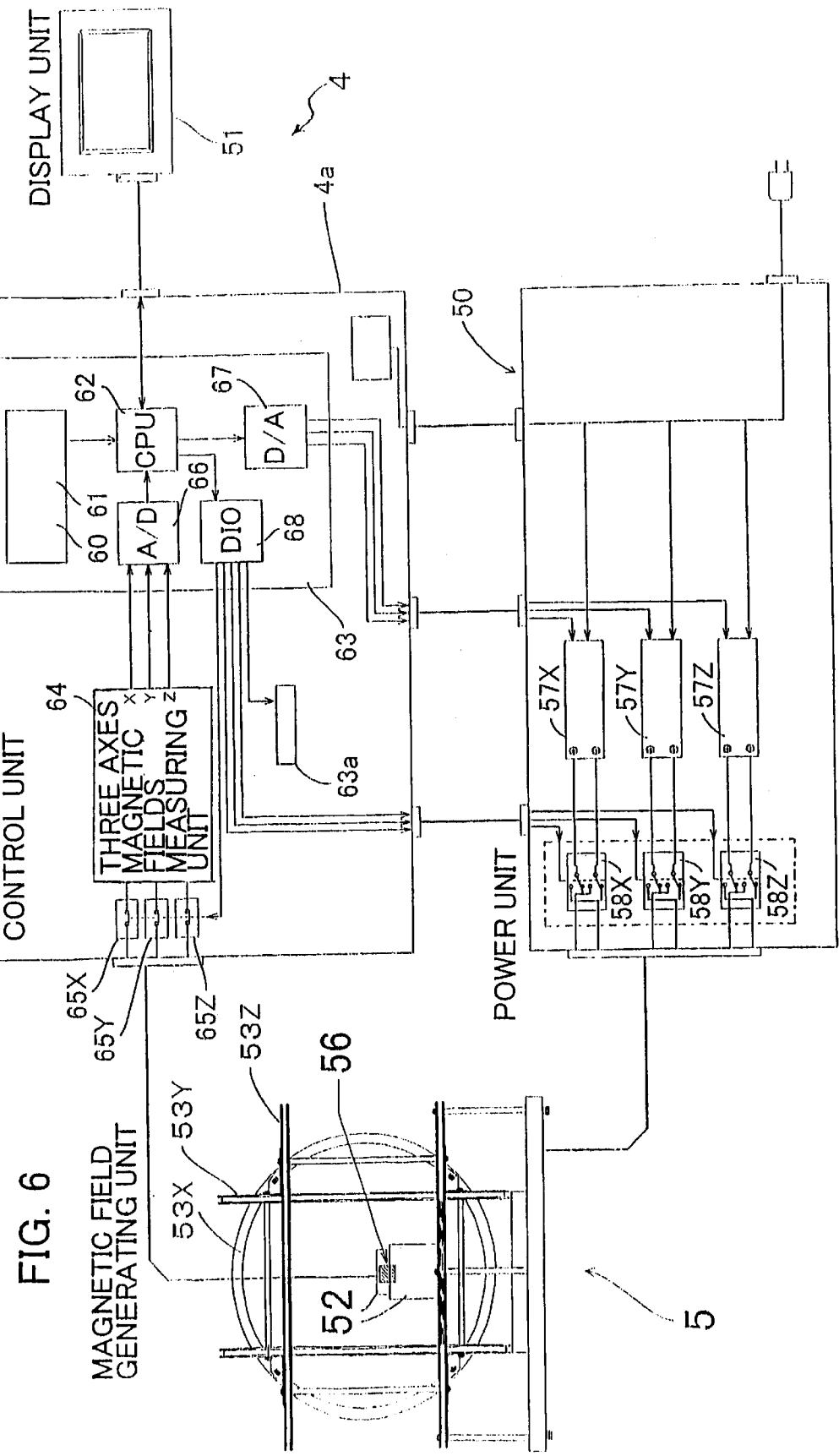

FIG. 10A
OFFSET ADJUSTMENT AT ZERO MAGNETIC FIELD (SC02)
@FSR=70, FSF=2048

AD VALUE ADCs, ADCr

OSR=130
OSR=129

MAGNETIC FIELD B[uT]

-100  -50  -20  0  20  50  100

FIG. 10B
DETECTION OF STRONG MAGNETIC FIELD (SC03)
@FSR=70, FSF=2048

AD VALUE ADCs, ADCr

Diff<200
Diff≧200

ADCr
ADCs

MAGNETIC FIELD B[uT]

-100  -50  -20  0  20  50  100

FIG. 10C
OFFSET ADJUSTMENT (SC04)
@FSR=70, FSF=2048

AD VALUE ADCs, ADCr

ADCr @OSR=134
ADCs @OSR=134
1000
ADCr @OSR=130
ADCs @OSR=130

MAGNETIC FIELD B[uT]

-100  -50  -20  0  20  50  100

FIG. 10D
OFFSET ADJUSTMENT (SC06)
@FSR=70, FSF=2048

AD VALUE ADCs, ADCr

ADCr @OSR=134
ADCs @OSR=134
1000

MAGNETIC FIELD B[uT]

-100  -50  -20  0  20  50  100

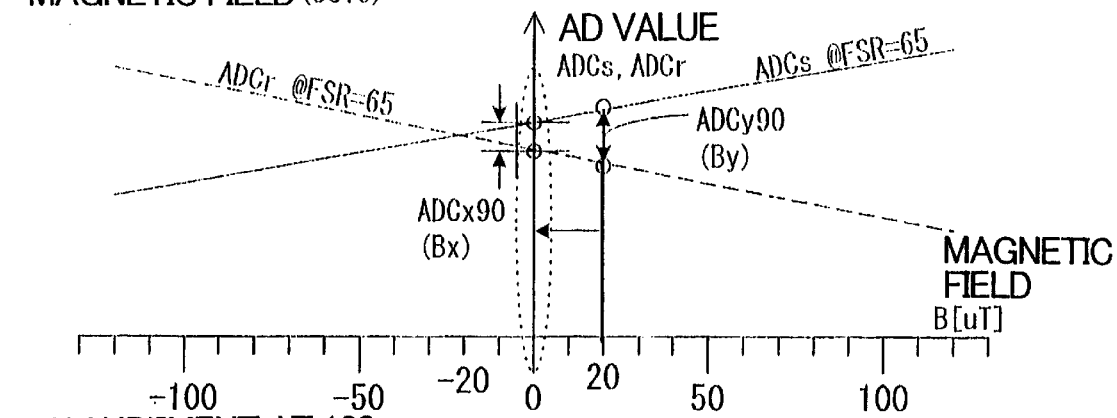
FIG. 12A
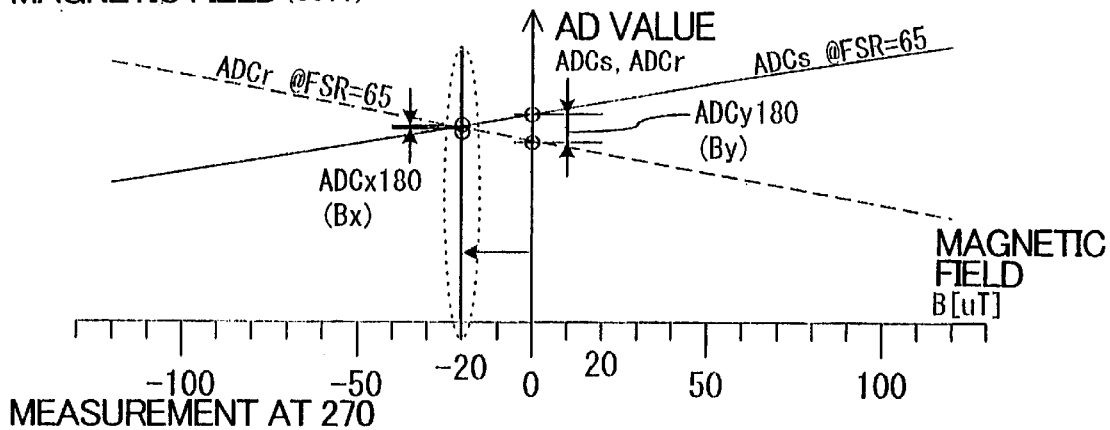
FIG. 12B
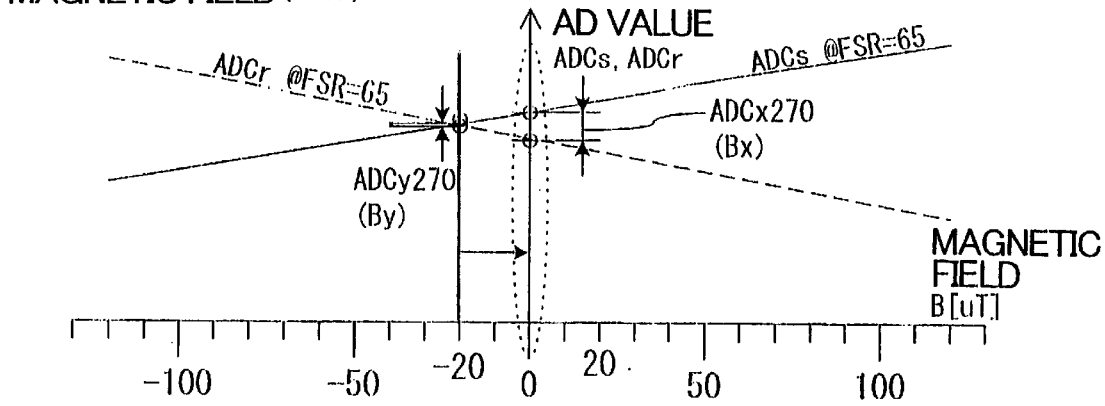
FIG. 12C
WRITE TO EEPROM (SC14)
FIG. 12D

ELECTRONIC AZIMUTH METER AND TIMEPIECE

BACKGROUND OF THE INVENTION

1. Field of the Invention

The present invention relates to an electronic azimuth meter (hereinafter, referred to also as "electronic compass") having a magnetic detector including a magnetic sensor, further particularly to a method of adjusting (hereinafter, referred to also as "calibration" or "correction") of an electronic azimuth meter and an apparatus used for carrying out the method.

2. Description of the Prior Art

According to a magnetic detector comprising a magnetic sensor (typically comprising a bridge circuit of an MR element) and an A/D converter, sensitivity (span of output) and offset of the detector differs for each detector and therefore, it is necessary to individually adjust an electronic azimuth meter having the magnetic detector under a magnetic field produced by a magnetic field generating apparatus.

In adjusting thereof, in order to synchronize the magnetic field generating apparatus with the magnetic detector of the electronic azimuth meter, a control unit of the magnetic field generating apparatus is electrically connected to the electronic azimuth meter by a wiring and a case back or a battery of the electronic azimuth meter is detached for the electric connection.

However, according to the electronic azimuth meter, there is a concern of changing an effective magnetic field applied to the magnetic sensor of the electronic azimuth meter by presence or absence of a battery or the case back and there is a concern that it is difficult to properly adjust the electronic azimuth meter.

SUMMARY OF THE INVENTION

The invention has been carried out in view of the above-described point and it is an object thereof to provide an adjusting method of an electronic azimuth meter capable of properly adjusting the electronic azimuth meter and an apparatus used for carrying out the method, that is, an electronic azimuth meter adjusting system, a magnetic field generating apparatus for the adjusting system and an electronic azimuth meter adjusted by the adjusting method.

In order to achieve the object, according to an aspect of the invention, there is provided a method of adjusting an electronic azimuth meter which is a method of adjusting an electronic azimuth meter having a magnetic detector, the method comprising the steps of generating magnetic fields including a magnetic field for starting to adjust the electronic azimuth meter at magnetic field generating means capable of generating a magnetic field stronger than the geomagnetism by an adjusting magnetic field generating sequence, arranging the electronic azimuth meter for acquiring output data of magnetic sensors by a data acquisition sequence for adjusting the electronic azimuth meter in correspondence with the magnetic field generating sequence in a magnetic field region produced by the magnetic field generating means by the magnetic field generating sequence, and starting the adjusting data acquisition sequence of the electronic azimuth meter by sensing the strong magnetic field for starting to adjust the electronic azimuth meter by the magnetic detector.

According to the method of adjusting an electronic azimuth meter of the invention, since "the strong magnetic field for starting to adjust the electronic azimuth meter is generated by the magnetic field generating means and the sequence of acquiring data for adjusting the electronic azimuth meter is started by the strong magnetic field for starting to adjust the electronic azimuth meter", by only generating the strong magnetic field for starting to adjust the electronic azimuth meter by the magnetic field generating means, the sequence of acquiring data for adjusting the electronic azimuth meter can be started. Further, according to the method of adjusting an electronic azimuth meter of the invention, since "the magnetic field generating means generates the magnetic field by the sequence of generating the magnetic field for adjusting the electronic azimuth meter and the electronic azimuth meter for acquiring output data of the magnetic detector by the sequence of acquiring data for adjusting the electronic azimuth meter in correspondence with the sequence of generating the magnetic field, is arranged in the magnetic field region produced by the magnetic field generating means by the magnetic field generating sequence", after starting the adjusting data acquisition sequence of the electronic azimuth meter, the electronic azimuth meter can acquire, as adjusting data, output data of the magnetic detector by the adjusting data acquisition sequence in correspondence with the magnetic field generating sequence under the magnetic field produced by the adjusting magnetic field generating sequence by the magnetic field generating means. That is, the magnetic field generating means generates the magnetic field for adjustment by itself by the adjusting magnetic field generating sequence and the electronic azimuth meter acquires output data (data for adjustment) of the magnetic detector by itself by the adjusting data acquiring sequence. The adjusting data acquiring sequence is previously adjusted to progress in correspondence with the adjusting magnetic field generating sequence and the two sequences are started actually simultaneously by generating the magnetic field for starting the adjustment and detecting the subject magnetic field. Therefore, even when a control unit of the magnetic field generating means and the electronic azimuth meter are not electrically connected by a wiring, the two sequences can be progressed at actually the same or corresponding timing with the magnetic field as a medium. As a result, the electronic azimuth meter can be adjusted by progressing the two sequences actually similar to the case of adjusting the electronic azimuth meter by exchanging synchronizing signals between the control unit of the magnetic field generating means and the electronic azimuth meter. Further, electric wiring connection is dispensed with between the control unit of the magnetic field generating means and the electronic azimuth meter and therefore, it is not necessary to detach a battery or a case back in the adjustment, the electronic azimuth meter can be adjusted while maintaining the electronic azimuth meter in a mode of a finished product actually used and therefore, the electronic azimuth meter can properly be adjusted by avoiding a concern of causing error derived from presence or absence of the battery or the case back in the adjustment.

In the specification, a technical term of "magnetic field" is used to define "magnetic flux density" unless specified otherwise and a case of designating inherently "magnetic flux density" is referred to as "magnetic field". In designation thereof, not H but B is used. Further, in the specification, strong magnetic field signifies a magnetic field stronger than a magnetic field by the geomagnetism (about several $\mu$T (micro tesla) and "strong" designates a magnetic field which can be differentiated from the magnetic field by the geomagnetism owing to the intensity of the magnetic field.

Therefore, for example, the strong magnetic field designates a magnetic field several times as much as or more than the geomagnetism, preferably, about ten times or more thereof, typically about 100 $\mu$T. Naturally, further stronger magnetic field may be used, however, in order to minimize a concern of strongly magnetizing a magnetic part of an electronic azimuth meter, it is preferable that the magnetic field is not strong excessively. Further, in the specification, unless specified otherwise, azimuth or azimuth angle is represented by notation $\phi$, north is represented by 0 degree, east is represented by 90 degree, south is represented by 180 degree and west is represented by 270 degree. The geographical azimuth angle is represented by notation $\theta$ and is described as display azimuth angle. Further, $\phi+\theta=360°$.

The adjusting magnetic field generating sequence typically includes four azimuth magnetic fields generating steps for successively generating magnetic fields of four azimuths. By measuring the output of the magnetic detector under the magnetic fields of the four azimuths, there can be carried out calibration of the electronic azimuth meter for providing a predetermined output by correcting influence by a magnetic part included in the electronic azimuth meter. However, so far as such a calibration of the electronic azimuth meter is possible, in place of the magnetic fields of the four azimuths, other set of magnetic fields may be generated.

Further, the adjusting magnetic field generating sequence typically includes a span (sensitivity) and offset adjusting magnetic field generating step for adjusting span (sensitivity) and offset of an output of the magnetic detector of the electronic azimuth meter and the span and offset adjusting magnetic field generating step typically comprises a span and offset adjusting magnetic field generating step of an output of an A/D converter connected to magnetic sensors of the magnetic detector and constituting a portion of the magnetic detector.

The magnetic detector of the electronic azimuth meter typically includes a magnetic sensor such as an MR element (transducer for converting a magnetic field signal into an electric signal) and an A/D converter for converting an analog output (data) of the magnetic sensor into digital data. Therefore, the offset and the sensitivity (span) of the magnetic detector are dependent upon the characteristic of the magnetic sensor main body or a related element of the sensor (current for driving an element of the sensor) and the characteristic of the A/D converter. However, so far as the respective element of the magnetic detector is maintained in a predetermined range, by adjusting sensitivity of the A/D converter (span of an output of the A/D converter) and offset of an output of the A/D converter providing final output of a total of the magnetic sensor, that is, the total of a magnetic field detecting system, the span and the offset of the magnetic detector, that is, the magnetic field detecting system can be adjusted.

Further, in order to achieve the above-described object, according to another aspect of the invention, there is provided a system of adjusting an electronic azimuth meter, the system comprising a magnetic field generating apparatus capable of generating a magnetic field stronger than the geomagnetism for generating a magnetic field including the strong magnetic field for starting to adjust the electronic azimuth meter, and an electronic azimuth meter including a magnetic detector for acquiring output data of the magnetic detector by a data acquisition sequence for adjusting the electronic azimuth meter in correspondence with the magnetic field generating sequence, the electronic azimuth meter comprising an adjusting data acquisition sequence starting control unit for starting the data acquisition sequence for adjusting the electronic azimuth meter when the magnetic detector arranged below a magnetic field produced by the magnetic field generating means by the magnetic field generating sequence, senses the strong magnetic field for starting to adjust the electronic azimuth meter.

Further, according to another aspect of the invention, there is provided a magnetic field generating apparatus which is a magnetic field generating apparatus for a system of adjusting an electronic azimuth meter capable of generating a magnetic field stronger than the geomagnetism, wherein a magnetic field including the strong magnetic field for starting to adjust the electronic azimuth meter for starting to acquire output data of a magnetic detector by an adjusting data acquisition sequence at the electronic azimuth meter by an adjusting magnetic field generating sequence.

Further, according to another aspect of the invention, there is provided an electronic azimuth meter which is an electronic azimuth meter having a magnetic detector for acquiring output data of the magnetic detector by a sequence of acquiring data for adjusting the electronic azimuth meter in correspondence with a sequence of generating a magnetic field for adjusting the electronic azimuth meter of a magnetic field produced by a magnetic field generating apparatus, the electronic azimuth meter comprising a control unit of starting the sequence of acquiring data for adjusting the electronic azimuth meter for starting the sequence of acquiring data for adjusting the electronic azimuth meter when a strong magnetic field for starting to adjust the electronic azimuth meter representing start of the sequence of generating the magnetic field for adjusting the electronic azimuth meter is detected by the magnetic detector.

The electronic azimuth meter may be of a mode of, for example, an electronic timepiece having an electronic azimuth meter integrated to the electronic timepiece. In that case, the electronic timepiece having the electronic azimuth meter is constituted to be switchable between a time piece mode operated as an ordinary electronic timepiece and an azimuth meter mode operated as an electronic azimuth meter by a push button switch for switching the modes.

BRIEF DESCRIPTION OF THE SEVERAL VIEWS OF THE DRAWINGS

A preferred form of the present invention is illustrated in the accompanying drawings in which:

FIGS. 2A, 2B, 2C and 2D show an electronic azimuth meter constituting the electronic azimuth meter adjusting system of FIG. 1 and adjusted by the electronic azimuth meter adjusting system in which FIG. 2A is an explanatory plane view of the electronic azimuth meter and FIGS. 2A, 2B, 2C and 2D are explanatory views of display of the electronic azimuth meter of FIG. 2A;

[FIG. 4]

FIGS. 4A, 4B and 4C are explanatory views of a magnetic sensor of the electronic azimuth meter of FIGS. 2A, 2B, 2C and 2D in which FIG. 4A is a schematic circuit diagram of the magnetic sensor and a peripheral circuit, FIG. 4B illustrates time charts of drive and read pulses of a and FIG. 4C is a graph for explaining an output signal of FIG. 4A;

FIG. 6 is a block diagram of a magnetic field generating apparatus in the electronic azimuth meter adjusting system of FIG. 1;

FIG. 7A is a plane view, FIG. 7B is a front view and FIG. 7C is a side view.

FIG. 8A is an explanatory plane view and FIG. 8B is an explanatory front view;

FIGS. 10A, 10B, 10C and 10D are schematic graphs for explaining initial several steps in the process of FIG. 9;

FIGS. 12A, 12B and 12C are schematic graphs for explaining final several steps in the process of FIG. 9.

DETAILED DESCRIPTION OF THE PREFERRED EMBODIMENTS

An explanation will be given of a preferable embodiment of the invention based on a preferable example shown in the attached drawings.

EXAMPLES

Figure 1:
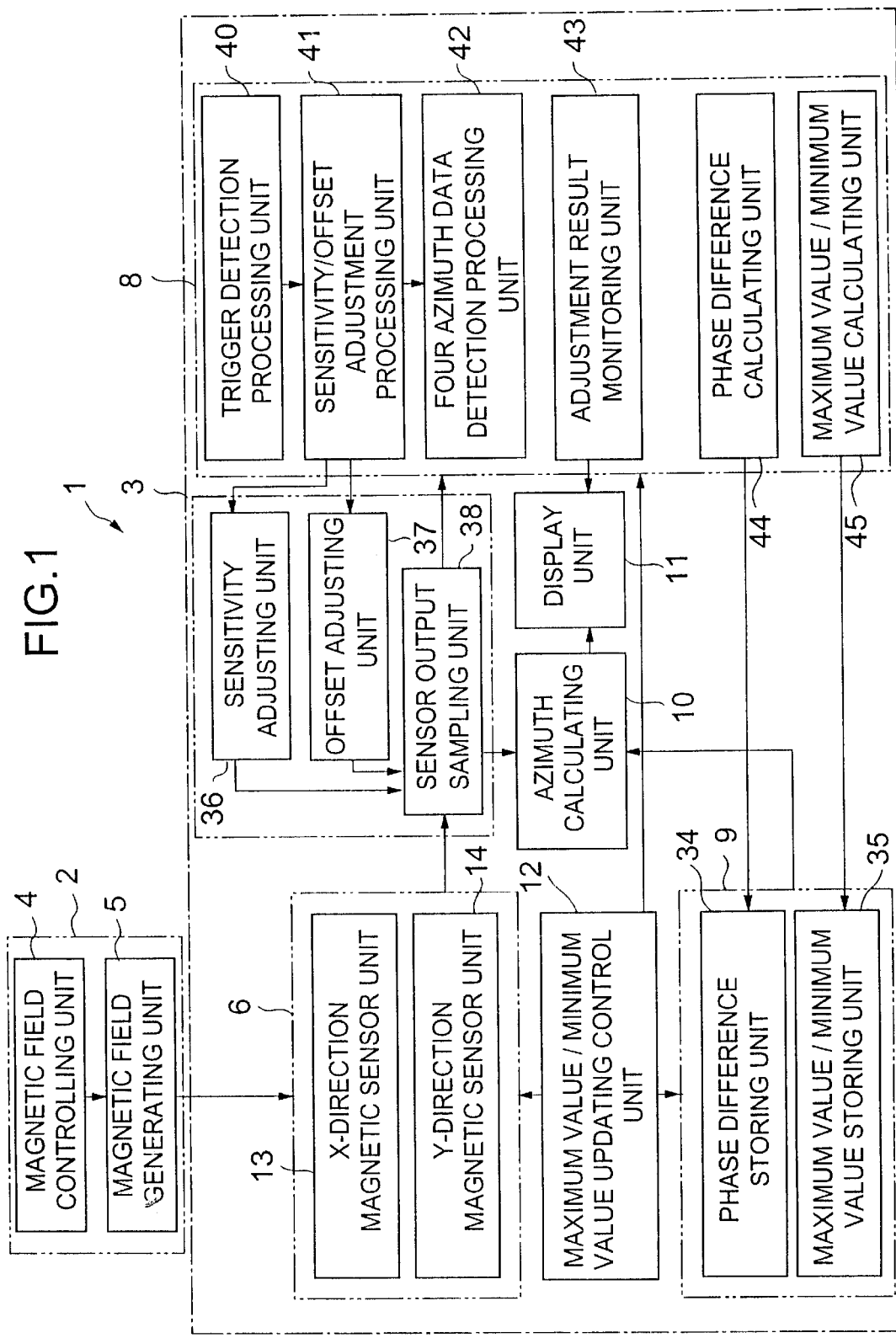
FIG. 1 is a functional block diagram of an electronic azimuth meter adjusting system according to a preferable embodiment of the invention.

An electronic azimuth meter adjusting system 1 according to a preferable example of the invention, is provided with a magnetic field generating apparatus 2 and an electronic azimuth meter 3 as shown in FIG. 1. The magnetic field generating apparatus 2 is provided with a magnetic field generating unit 5 as means for generating a magnetic field and a magnetic field controlling unit 4 for controlling generation of a magnetic field by the magnetic field generating unit 5 and specifying a sequence of generating the magnetic field for adjustment.

The electronic azimuth meter 3 is constituted by an azimuth sensor or a magnetic sensor 6, an A/D converter 7 sensitivity and offset of which are adjustable and which is a sensor output sampler for sampling an output of the azimuth sensor (magnetic sensor) 6, an initial adjustment controlling unit 8 which is a data acquisition sequence controlling unit for controlling initial adjustment of the electronic azimuth meter, an iherent parameter or an inherent parameter storing unit 9 for holding data for adjustment provided by the initial adjustment to the electronic azimuth meter 3, an azimuth calculating unit 10 for calculating an azimuth based on content of the inherent parameter storing unit 9 and a detection output from the adjusted A/D converter 7 of the azimuth sensor (magnetic sensor) 6, a display unit 11 for displaying an initially adjusted state and calculated azimuth and an updating control unit 12 used when a user of the electronic azimuth meter 3 adjusts the electronic azimuth meter 3 by himself. According to the example, a magnetic field detector of the electronic azimuth meter 3 comprises the azimuth sensor (magnetic sensor) 6 and the A/D converter 7.

Figure 4A:
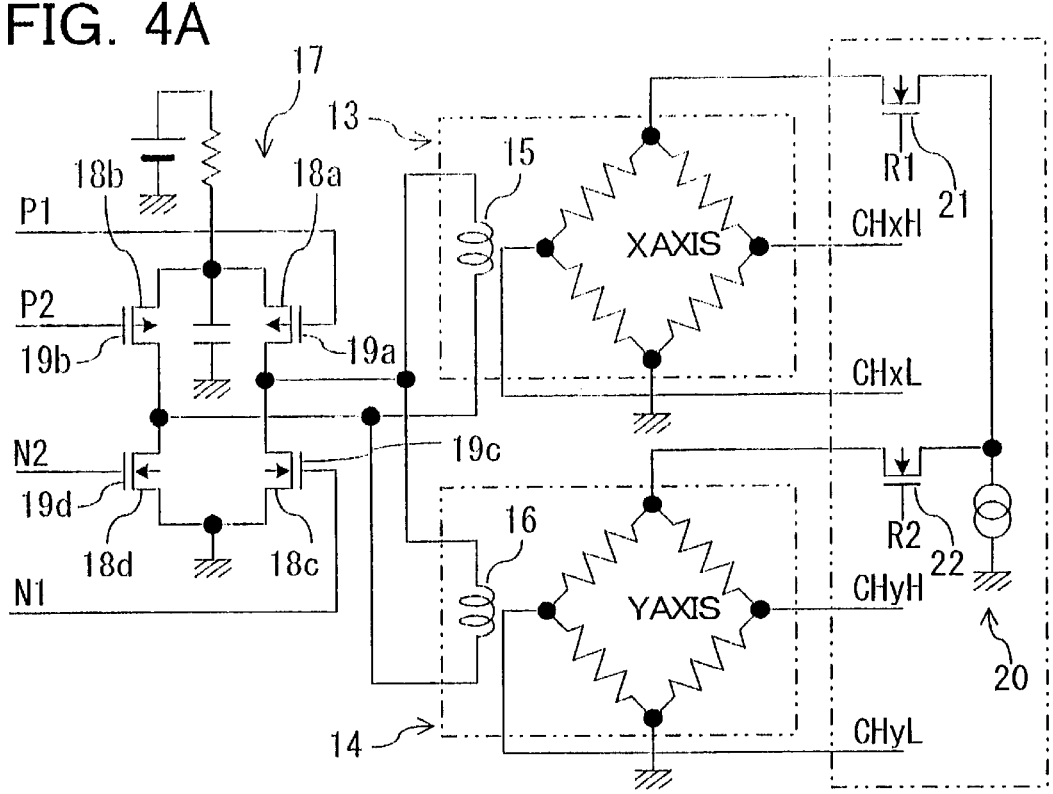

The azimuth sensor or the magnetic sensor 6 includes an X-direction magnetic sensor 13 and a Y-direction magnetic sensor 14 and includes a bridge circuit of a magnetic sensor main body such as an MR elements (magnetoresistive effect) as shown by FIG. 4A. The magnetic sensors 13 and 14, are applicable with magnetic fields (hereinafter, referred to as "magnetized magnetic field") for magnetizing the MR elements per se by respectively making pulse current of several microseconds flow to flip coils 15 and 16 and the magnetized magnetic fields of the flip coils 15 and 16 can be inverted by PMOS drive signals P1 and P2 applied to gates 19a and 19b of PMOSFET 18A and 18B of a flip coil drive circuit 17 and NMOS drive signals N1 and N2 applied to gates 19c and 19d of NMOSFET 18c and 18d. By calculating a difference between outputs of the magnetic sensors 13 and 14 when directions of the magnetized magnetic field applied on the MR elements of the magnetic sensors 13 and 14, are changed in positive and negative direction, a magnetic field can be detected by removing offsets of the sensors 13 and 14 per se. Further, currents are made to flow to the magnetic sensors 13 and 14 only during time periods different from each other for opening respective FET gates 21 and 22 of a sensor drive circuit 20 and during the respective time periods, outputs in an X-direction and a Y-direction (CHxH-CHxL) and (CHyH-CHyL) are sampled as set outputs Vxs and Vys as well as reset outputs Vxr, and Vyr (FIG. 4B).

Figure 4B:
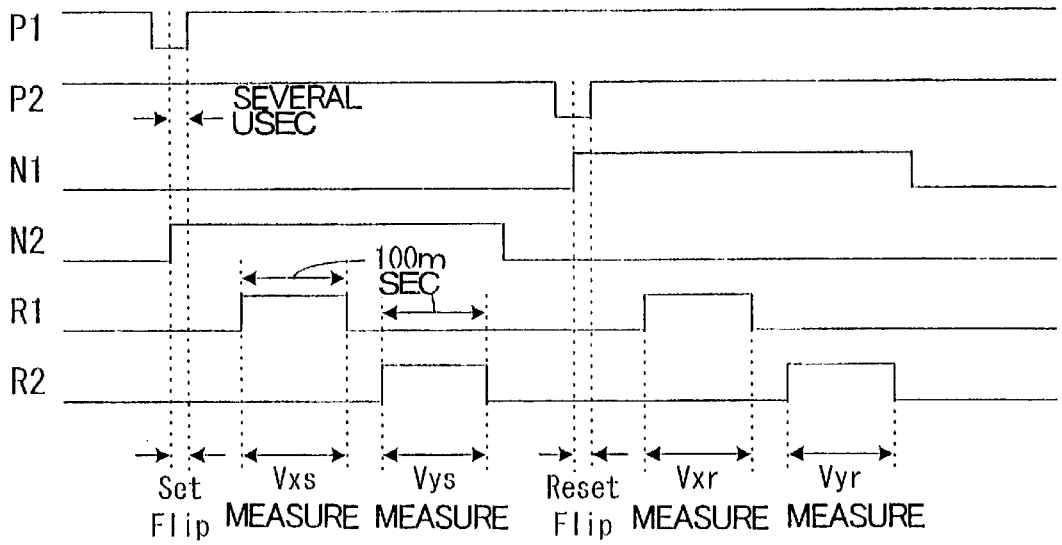
Figure 4C:
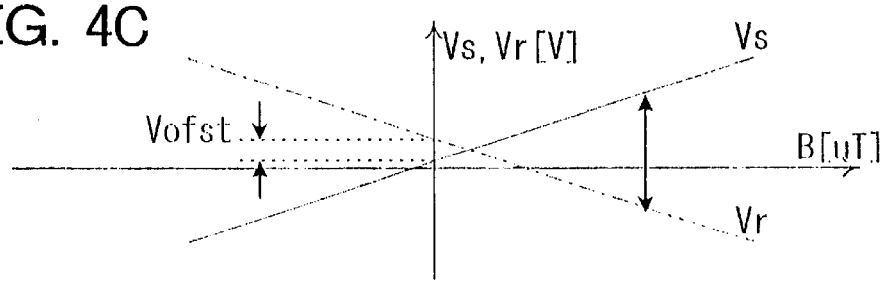

That is, as shown by FIG. 4B, the PMOS drive signal P1 for setting is applied to the gate 19a and the gate 19d is opened by the NMOS drive signal N2 for setting and the MR elements forming the bridges of the X-direction and the Y-direction magnetic sensors 13 and 14, are applied with forward direction magnetized magnetic fields by the flip coils 15 and 16. Thereafter, during time periods of successively opening the FET gates 21 and 22 by read control signals R1 and R2 by about 100 milliseconds, Vxs and Vys (represented by notation Vs when generally referred) as (CHxH-CHxL) and (CHyH-CHyL) are measured. Next, the PMOS drive signal P2 for resetting is applied to the gate 19b and simultaneously, the gate 19c is opened by the NMOS drive signal N2 for resetting, and the MR elements forming the bridges of the X-direction and the Y-direction magnetic sensors 13 and 14, are applied with magnetized magnetic fields in the inverse direction by the flip coils 15 and 16. Thereafter, Vxr and Vyr (represented by notation Vr when generally referred) are measured as (CHxH-CHxL) and (CHyH-CHyL) during time periods of successively opening the FET gates 21 and 22 by about 100 milliseconds. The outputs Vs and Vr of the magnetic sensors 13 and 14 respectively show characteristics dependent on a magnetic field B as shown by, for example, FIG. 4C. FIG. 4C shows outputs of the magnetic sensors 13 and 14 under a zero magnetic field, that is, offset Vofst. It is preferable that the azimuth sensor (magnetic sensor) 6, that is, the X-direction and the Y-direction magnetic sensors 13 and 14 and peripheral circuits are those described in, for example, U.S. Pat. No. 5,521,501.

Further, the electronic azimuth meter 3 is provided with a mode of an electronic timepiece as shown by, for example, FIG. 2A and the X-direction and the Y-direction magnetic sensors 13 and 14 constituting the azimuth sensor (magnetic sensor) 6 are respectively disposed at, for example, a right upper portion thereof in plane view.

Figure 3:
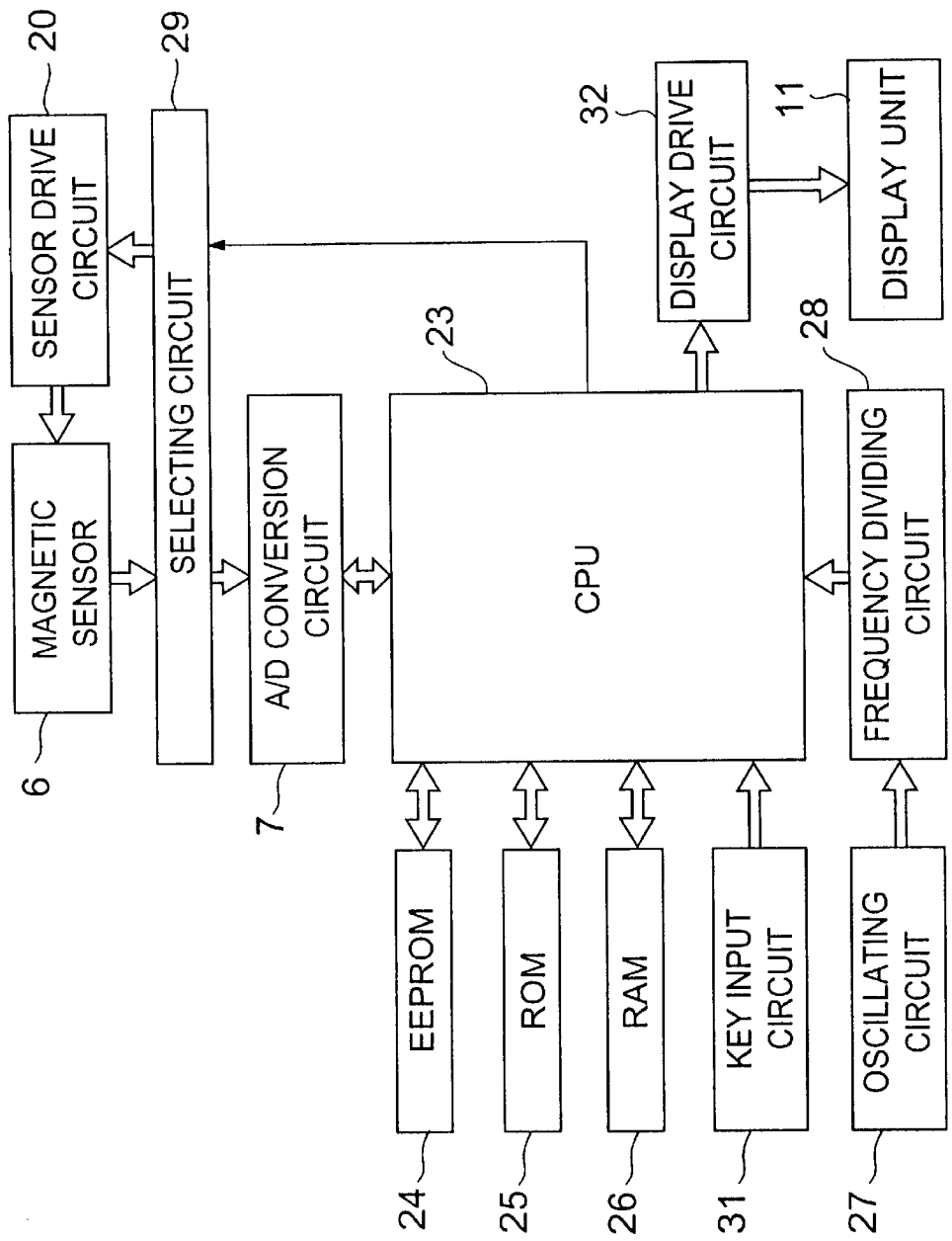
FIG. 3 is a block diagram constituting a hardware of the electronic azimuth meter of FIGS. 2A, 2B, 2C and 2D.

In view of a hardware constitution, as shown by FIG. 3, in addition to the magnetic sensor (azimuth sensor) 6 and the display unit 11, the electronic azimuth meter 3 is provided with CPU 23, memories such as EEPROM 24, ROM 25 and RAM 26, a clock generating unit comprising an oscillating circuit 27 and a frequency dividing circuit 28, peripheral circuits of the azimuth sensor (magnetic sensor) 6 such as a selecting circuit 29 and the A/D conversion circuit or A/D converter 7, an instruction input unit such as a key input circuit 31 connected to push button switches 31a, 31b, 31c and 31d (FIG. 2A) and a peripheral circuit of the display unit 11 such as a display drive circuit 32. For example, the push button switch 31a is a switch for instructing the device to change modes to an adjustment mode and the push button switch 31b is a switch for instructing the device to switch between an electronic azimuth meter mode and a timepiece mode. That is, the electronic azimuth meter 3 is one mode of an electronic timepiece with an electronic azimuth meter integrated in the electronic timepiece and is be switchable between the timepiece and is be switchable between the timepiece mode operated as an ordinary electronic timepiece and the azimuth meter mode operated as the electronic azimuth meter by the push button switch 31b for switching the modes.

The selecting circuit 29 controls the device to open and close the FET gates 21 and 22 for driving the X-direction and the Y-direction magnetic sensors 13 and 14 of the azimuth sensor (magnetic sensor) 6, sampling the outputs CHxH, CHxL, CHyH and CHyL and provides the differences (CHxH-CHxL) and (CHyH-CHyL) to the sensor sampling portion, that is, the A/D converter or A/D converting circuit 7.

When as in the timepiece type electronic azimuth meter 3 of FIG. 2A, the X-direction and the Y-direction magnetic sensors 13 and 14 constituting a sensor main body of the azimuth sensor (magnetic sensor) 6, are disposed at a vicinity of a battery (substantially coinciding with a circle 11a representing a display region of the display unit 11 of the electronic azimuth meter 3 in FIG. 2A) 33 such as a button type battery, a battery cover comprising a magnetic part which becomes more or less ferromagnetic by fabricating thereof as in SUS 304, is magnetized by an outside magnetic field such as the geomagnetism and a magnetic field produced by magnetizing the magnetic part is formed to overlap the outside magnetic field at a location of the azimuth sensor (magnetic sensor) 6. Therefore, a magnetic field sensed by the azimuth sensor (magnetic sensor) 6 differs from the outside magnetic field per se and the output of the magnetic sensor 6 is changed in accordance therewith. Further, there are dispersions in the offset and the sensitivity of the azimuth sensor (magnetic sensor) 6. As a result, X-direction and Y-direction detection outputs Vx and Vy of the A/D converter 7, are overlapped with the variations.

The inventors have found that an X-direction magnetic field detection output $Vx(\phi)$ and a Y-direction magnetic field detection output $Vy(\phi)$ are given respectively by Equation (1) and Equation (2) as follows as a result of repeating experimental verification on these varying factors.

$$Vx(\phi) = Sx \cdot Bh \cdot \cos(\phi - \delta x) + Ox \quad \text{Equation (1)}$$

$$Vy(\phi) = Sy \cdot Bh \cdot \sin(\phi - \delta y) + Oy \quad \text{Equation (2)}$$

where notation Sx designates a general sensitivity of the X-direction magnetic sensor 13 and the A/D converter 7 and notation Sy designates a general sensitivity of the Y-direction magnetic sensor 14 and the A/D converter 7 and notation Bh designates an outside magnetic field component in X-Y plane (horizontal component) ($\mu$T), notation $\phi$ designates a direction (degree) of the magnetic field, notation $\delta x$ designates a phase shift in an X-direction output, notation $\delta y$ designates a phase shift in a Y-direction output and notations Ox and Oy designates offset values in the X-direction and the Y-direction.

Figure 5:
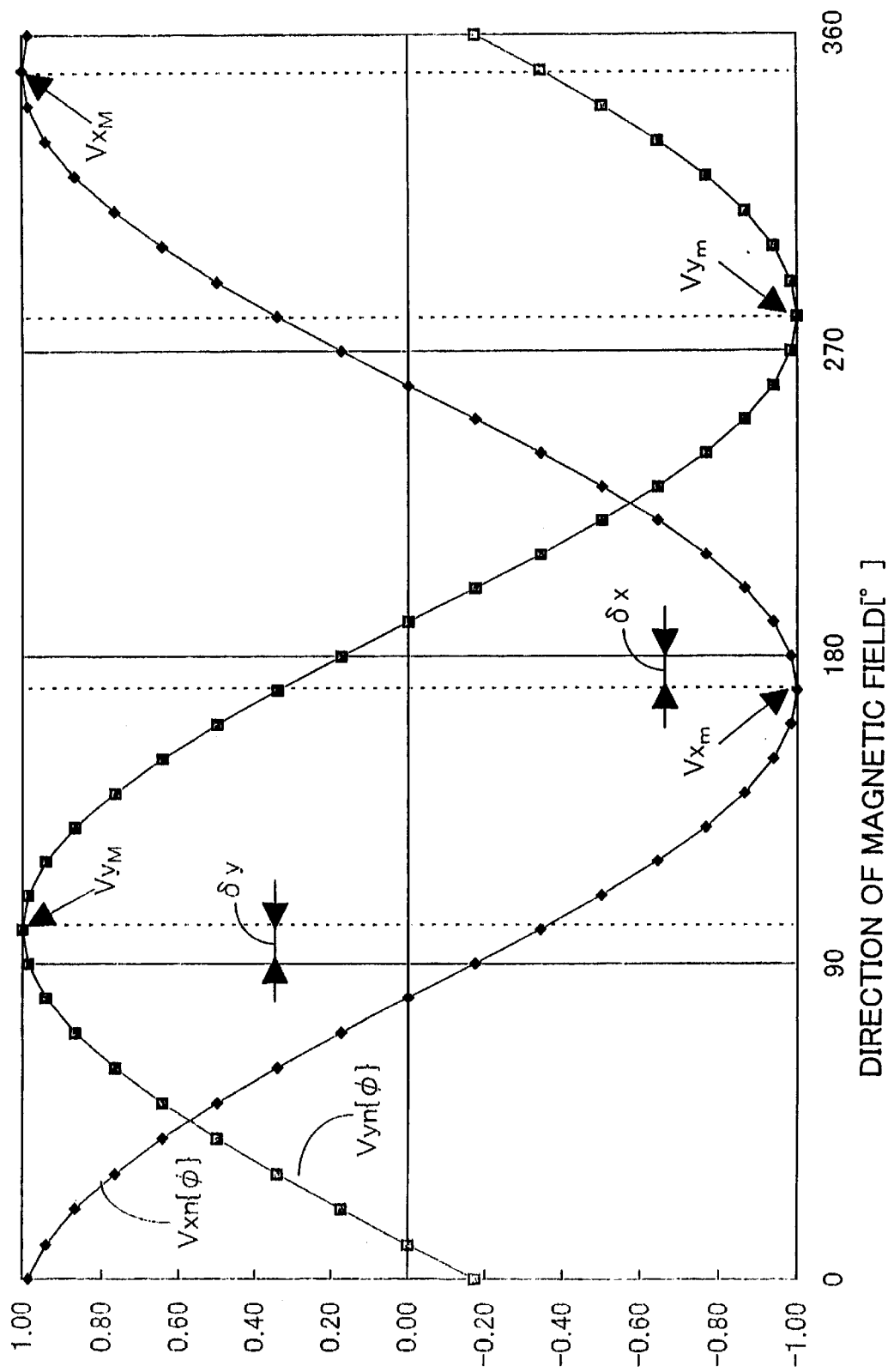
FIG. 5 is a graph showing azimuth angle dependency of the output signal of the magnetic sensor of the electronic azimuth meter of FIGS. 2.

Further, Equation (1) and Equation (2) are modified by using a maximum value $Vx_M$ and a minimum value $Vx_m$ of the X-direction detection output and a maximum value $Vy_M$ and a minimum value $Vy_m$ of the Y-direction detection output as follows.

$$Vx(\phi) = \{(Vx_M - Vx_m)/2\}\cos(\phi - \delta x) + (Vx_M + Vx_m)/2 \quad \text{Equation (1-1)}$$

$$Vy(\phi) = \{(Vy_M - Vy_m)/2\}\cos(\phi - \delta y) + (Vy_M + Vy_m)/2 \quad \text{Equation (2-1)}$$

therefore, in view of output values which are nomarlized such that amplitudes thereof become 1 as follows.

$$Vxn(\phi) = (Vx - Ox)/Sx \cdot Bh = [Vx - \{(Vx_M + Vx_m)/2\}]/[\{(Vx_M - Vx_m)/2\}] = \cos(\phi - \delta x) \quad \text{(Equation 1-2)}$$

$$Vyn(\phi) = (Vy - Oy)/Sy \cdot Bh = [Vy - \{(Vy_M + Vy_m)/2\}]/[\{Vy_M - Vy_m)/2\}] = \cos(\phi - \delta y) \quad \text{(Equation 2-2)},$$

as shown by FIG. 5, the output values coincide with magnetic fields $Bxn(\phi) = \cos \phi$ and $Byn(\phi) = \sin \phi$ which are normalized to magnitude 1 except that there are phase shifts or phase differences of $\delta x$ and $\delta y$.

Further, the inventors have experimentally found that the phase differences or phase shifts $\delta x$ and $\delta y$ are actually inherent to the respective electronic azimuth meter 3 and are hardly dependent actually on interchange of the battery 33 which is a magnetic part and the interchange of the battery actually vary only the respective offset values Ox and Oy.

In consideration of the fact that following relationships are established from Equation (1)
$Vx(0) = Sx \cdot Bh \cdot \cos \delta x + Ox$
$Vx(90) = Sx \cdot Bh \cdot \sin \delta x + Ox$
$Vx(180) = -Sx \cdot Bh \cdot \cos \delta x + Ox$
$Vx(270) = -Sx \cdot Bh \cdot \sin \delta x + Ox$
$\tan \delta x = \{Vx(90) - Vx(270)\}/\{Vx(0) - Vx(180)\}$,
accordingly, $$\delta x = \arctan\{Vx(90) - Vx(270)\}/\{Vx(0) - Vx(180)\} \quad \text{Equation (3)}$$

further,
$Ox = \{Vx(0) + Vx(180)\}/2$
$Sx \cdot Bh = \{Vx(0) - Vx(180)\}/2 \cos \delta x$.
Therefore, the maximum value $Vx_M$ of the X-direction detection output is as follows.

$$Vx_M = Sx \cdot Bh + Ox = \{Vx(0) - Vx(180)\}/2 \cos \delta x + \{Vx(0) + Vx(180)\}/2 \quad \text{Equation (4)}$$

further, the minimum value $Vx_m$ of the X-direction detection output is as follows.

$$Vx_m = -Sx \cdot Bh + Ox = -\{Vx(0) - Vx(180)\}/2 \cos \delta x + \{Vx(0) + Vx(180)\}/2 \quad \text{Equation (5)}$$

similarly, from Equation (2),
$\tan \delta y = \{Vx(180) - Vy(0)\}/\{Vy(90) - Vy(270)\}$,
therefore, $$\delta y = \arctan\{Vy(180) - Vy(0)\}/\{Vy(90) - Vy(270)\} \quad \text{Equation (6)}.$$

Further, similarly, the maximum value VyM of the Y-direction detection output is as follows.

$$Vy_M = Sy \cdot Bh + Oy = \{Vy(90) - Vy(270)\}/2 \cos \delta y + \{Vy(90) + Vy(270)\}/2 \quad \text{Equation (7)}$$

further, the minimum value $Vy_m$ of the Y-direction detection output is as follows.

$$Vy_m = -Sy \cdot Bh + Oy = -\{Vy(90) - Vy(270)\}/2 \cos \delta y + \{Vy(90) + Vy(270)\}/2 \quad \text{Equation (8)}$$

Therefore, in initial adjustment in a factory, in addition to adjusting the sensitivity or the offset, there are detected four azimuth data Vx(0), Vy(0), Vx(90), Vy(90), Vx(180), Vy(180), Vx(270) and Vy(270), based on the detection values, the phase differences $\delta x$ and $\delta y$ are calculated by Equation (3) and Equation (6) and the maximum values $Vx_M$ and $Vy_M$ and the minimum values $Vx_m$ and $Vy_m$ by Equation (4), Equation (5), Equation (7) and Equation (8) and stored to the memory.

Hence, the phase differences δx and δy are stored to a phase difference storing unit 34 of the memory 9 shown in FIG. 1 and the maximum values $Vx_M$ and $Vy_M$ and the minimum values $Vx_m$ and $Vy_m$ are stored to a maximum value/minimum value storing unit 35. These storing units 34, 35 are formed within, for example, EEPROM24 as shown in FIG. 3. Further, the azimuth calculating unit 10 calculates Vxn and Vyn by calculating Equation (1-2) and Equation (2-2) from the detection outputs Vx and Vy from the A/D converter 7, calculates the azimuth angle φ therefrom, and converts the azimuth angle φ into geographical azimuth θ and makes the display unit 11 display thereof.

Meanwhile, the maximum value/minimum value updating control unit 12 updates stored content of the maximum value/minimum value storing unit 35 by sampling the output the minimum values $Vx_M$ and $Vy_M$ and the minimum values $Vx_m$ and $Vy_m$ during a time period of rotating the electronic azimuth meter 3 in a horizontal face by 360 degree as is known in Japanese Patent Publication No. 30364/1987 in order to readjust the electronic azimuth meter 3 when the battery 33 is interchanged. Thereby, even after interchanging the battery, the electronic azimuth meter 3 can properly detect the azimuth.

The A/D converter 7 is provided with a sensitivity adjusting unit 36, an offset adjusting unit 37 and a sensor output sampler main body portion, that is, a sensor output sampling unit 38 as described later in details. The initial adjustment controlling unit 8 is provided with a trigger detection processing unit 40, a sensitivity (span)/offset adjustment processing unit 41, a four azimuth data detection processing unit 42, an adjustment result monitoring unit 43, a phase difference calculating unit 44 and a maximum value/minimum value calculating unit 45 and includes a data acquisition sequence control program for making respective processing operations execute in a data acquisition sequence actually in synchronism with a magnetic field generated by a sequence of generating a magnetic field for adjustment by the magnetic field controlling unit 4 in initial adjustment. Further, the respective portions 40 through 45 of the adjustment controlling unit 8 are actually constituted by the data acquisition sequence control program stored in ROM 25 of FIG. 3 and CPU 23 executing the program.

The A/D converter 7 outputs X-direction and Y-direction set outputs ADCsx and ADCsy (represented by set output ADCs when X and Y directions are not differentiated from each other) when the X-direction and the Y-direction magnetic sensors 13 and 14 comprising the bridges of the MR elements, are under one direction (hereinafter, referred to as forward direction) magnetized magnetic field by a set of the signals P1 and N2, and outputs X-direction and Y-direction reset outputs ADCrx and ADCry (represented by reset output ADCr when directions of X and Y are not differentiated each other) when the X-direction and the Y-direction magnetic sensors 13 and 14 are under other direction (hereinafter, referred to as rearward direction) magnetized magnetic field by the reset signals P2 and N1. The set output ADCs is linearly increased or reduced in accordance with an increase or a reduction of outside magnetic field in a corresponding direction applied on a corresponding one of the magnetic sensor 13 or 14 as shown by a bold line in FIG. 10B explained later. The set output ADCr is linearly reduced or increased in accordance with an increase or a reduction in outside magnetic field in a corresponding direction applied to a corresponding one of the magnetic sensor 13 or 14. The ADC value is, for example, 14 bits data and is provided with a value between 0 through 16383.

The offset adjusting unit 37 of the A/D converter 7 comprises an X-direction offset adjusting unit and a Y-direction offset adjusting unit and offset rough adjustment values OSRx and OSRy (represented by offset rough adjustment value OSR when direction os X and Y are not differentiated from each other) in the respective directions are, for example, 8 bits data and is adjustable between 0 through 255. According to the offset rough adjustment value OSR, typically, regardless of the magnitude of the ADC value, a constant value in correspondence with the OSR value is added to the ADC value. Further, the more increased is the offset rough adjustment value OSR, the more increased is the ADC value including the offset and the more reduced is the offset rough adjustment value OSR, the more reduced is the ADC value including the offset (for example, FIGS. 10A and 10C explained later).

The sensitivity adjusting unit or the span adjusting unit 36 of the A/D converter 7, is constituted by an X-direction span adjusting unit and a Y-direction span adjusting unit and full scale rough adjustment values FSRx and FSRy (represented by full scale rough adjustment value FSR when directions of X and Y are not differentiated from each other), are, for example, 8 bits data and adjustable between 1 through 255 and full scale fine adjustment values FSFx and FSFy (represented by full scale fine adjustment value FSF when directions of X and Y are not differentiated from each other), are data of 12 bits independent from FSR and are used when fine adjustment of span by a unit of several counts is carried out. The full scale rough adjustment value FSR is multiplied by the ADC value as an inverse number (that is, operates as a divisor) and as is apparent from, for example, FIG. 11A described later in details, the more reduced is the full scale rough adjustment value FSR, the more increased is the ADC value. According to the full scale fine adjustment value FSF, the span is increased or reduced by ±12.5% in accordance with an increase and a reduction in the full scale fine adjustment value FSF centering on 2048. Further, as the A/D converter 7, there is used an A/D converter described in, for example, Japanese Patent Laid-Open No. 318403/1997.

Meanwhile, as shown by FIG. 6, in addition to the magnetic field controlling unit 4 and the magnetic field generating unit 5, the magnetic field generating apparatus 2 is provided with a magnetic field generating current supplying power source unit or power source unit 50 and an input/display unit 51 such as a touch panel display.

Figure 7A:
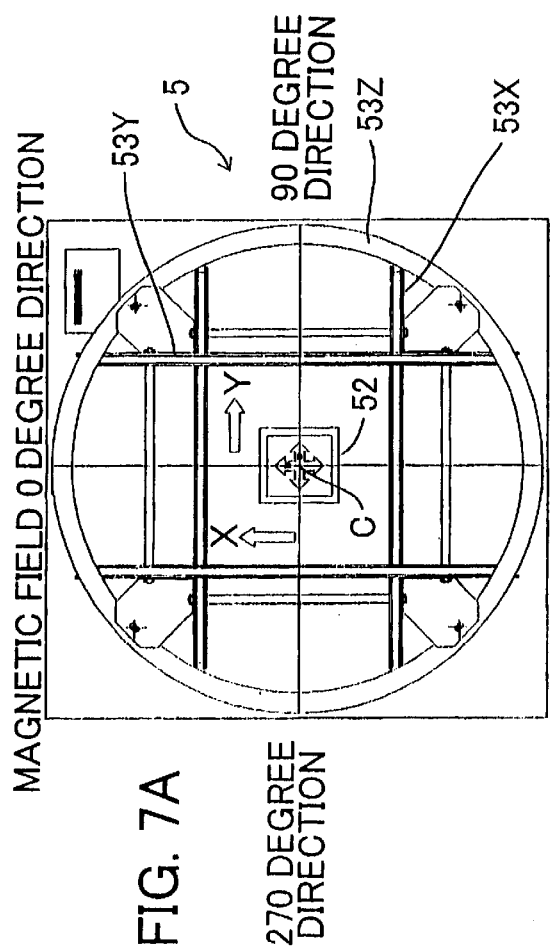
FIGS. 7A, 7B and 7C show a magnetic field generating unit in the magnetic field generating apparatus of FIG. 6.
Figure 7C:
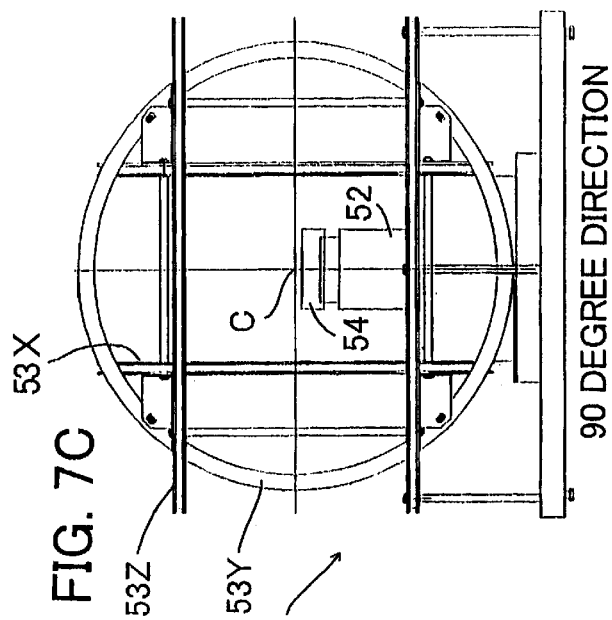
Figure 7B:
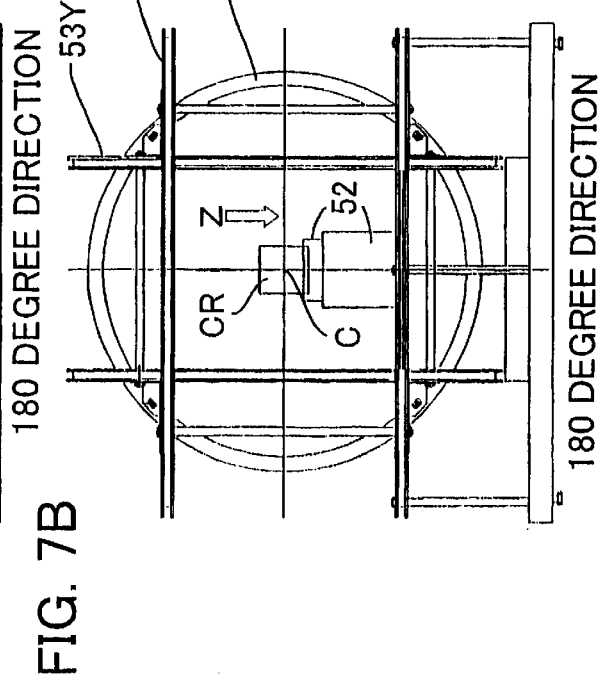
Figure 8A:
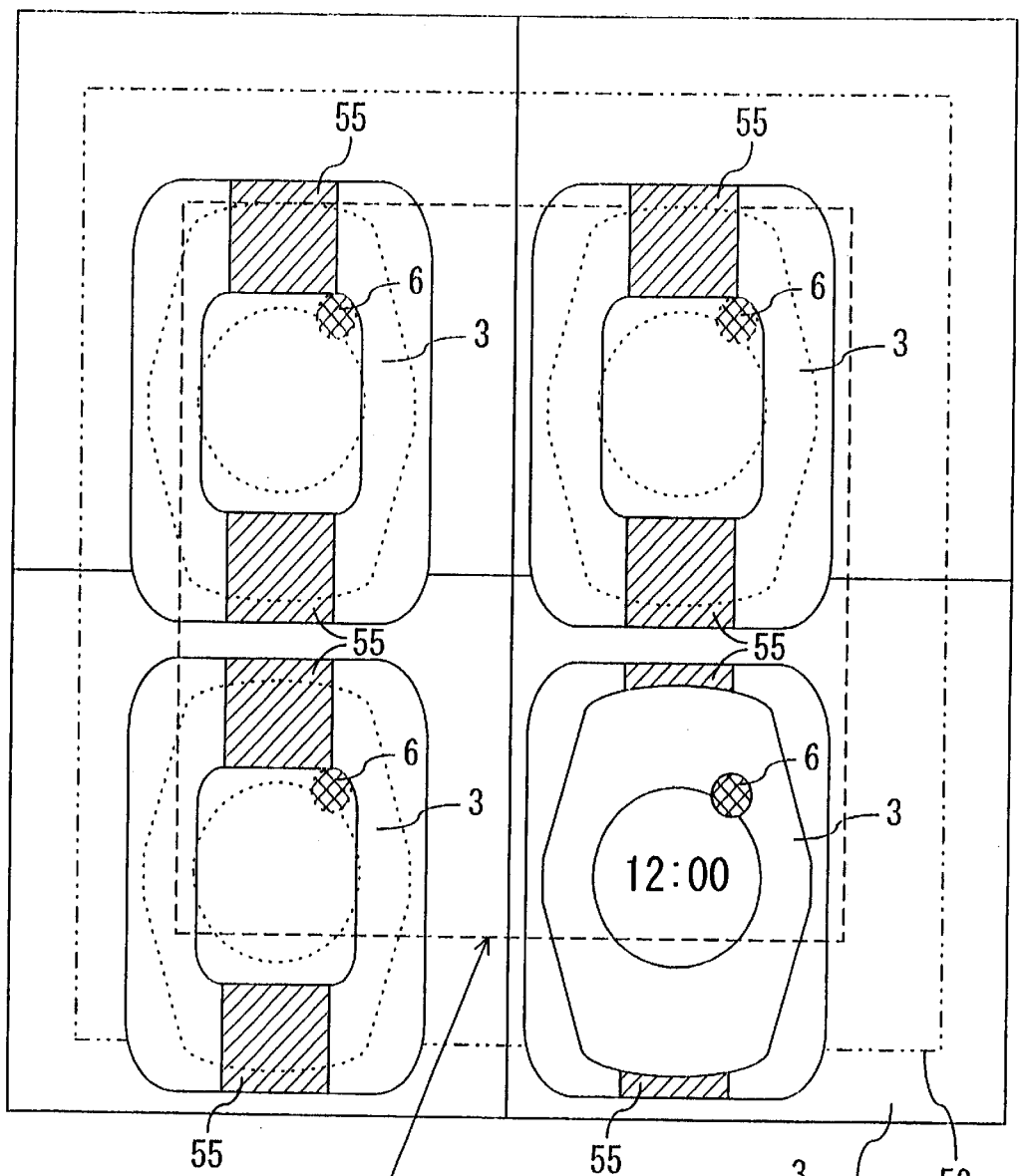
FIGS. 8A and 8B show a state of arranging the electronic azimuth meter at an electronic azimuth meter mounting unit in the magnetic field generating unit of FIGS. 7A, 7B and 7C.
Figure 8B:
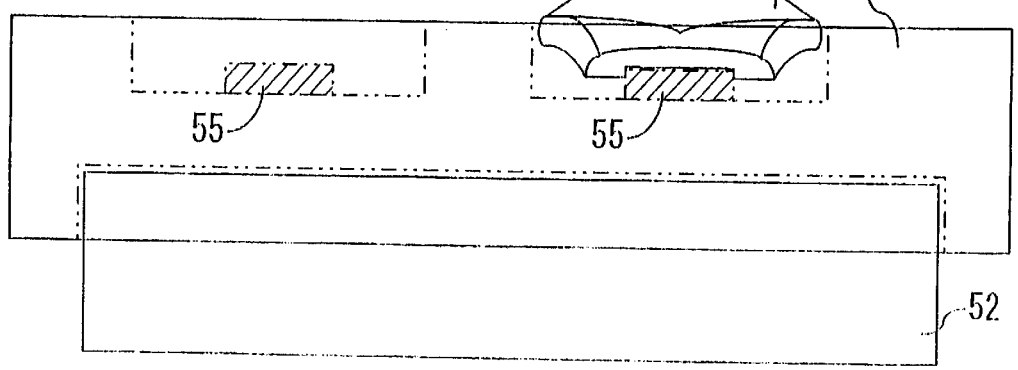

As is illustrated by FIG. 7 in details, the magnetic field generating unit 5 is provided with a sample mounting base 54 disposed above a stage 52 for mounting the electronic azimuth meter 3 and Hermholtz coils 53X, 53Y and 53Z (represented by notation 53 when generally designated) in X-direction, Y-direction and Z-direction for generating uniform magnetic fields in orthogonal three axes X, Y and Z-directions at the electronic azimuth meter 3 above the sample mounting base 54. In the illustrated example, for example, the magnetic field generating coils 53X, 53Y and 53Z in X-direction, Y-direction and Z-direction, are respectively about 82 cm, about 90 cm and about 100 cm and as shown by FIG. 8 and FIG. 7B, there is generated a spatially uniform magnetic field right at a central position C and a vicinity thereof of the coils 53X, 53Y and 53Z (for example, within square region CR of about 10 cm×about 10 cm centering on the point C). Therefore, the electronic azimuth meter 3 is arranged at a predetermined arranging position (for example, within the square region CR of about 10 cm×about 10 cm) of the sample mounting base 54 above the stage 52 (for example, provided with a square mounting region of about 13 cm×about 13 cm) along a guide portion 55 to dispose at a vicinity of the center C. According to an example shown in FIGS. 8, four pieces of the electronic azimuth meters 3 are arranged at intervals to a degree of capable of disregarding mutual electrostatic interference (for example, substantially 2 cm or more). Further, as shown by FIG. 6, at the stage 52, there is arranged a magnetic field detecting element or a magnetic field sensor 56 for detecting magnetic fields in X, Y and Z-directions.

The power source unit 50 is provided with constant current power sources 57X, 57Y and 57Z (represented by notation 57 when generally designated) for supplying currents having magnitudes and directions designated by the magnetic field controlling unit 4 to the X, Y and Z-direction coils 53X, 53Y and 53Z and relays 58X, 58Y and 58Z for making ON/OFF current supply paths in order to control timings of making currents flow to the respective coils 53X, 53Y and 53Z under control of the magnetic field controlling unit 4.

The magnetic field controlling unit 4 is provided with a control board unit 63 including a memory 61 stored with a sequence control program 60 for generating an adjusting magnetic field for generating a magnetic field for adjustment by a sequence of generating a magnetic field for adjustment described later in details and CPU 62 and a magnetic field measuring unit 64 for supplying electricity to the magnetic sensor 56 and outputting a measured value of the magnetic field by the magnetic sensor 56 in the form of a smoothed analog signal. Notations 65X, 65Y and 65Z designate relays for controlling timings of sampling of outputs in three axes X, Y and Z-directions, numeral 66 designates an A/D conversion circuit and numeral 67 designates a D/A conversion circuit. According to the controlling unit 4, the magnetic field generating sequence control program 60 of the memory 61 is executed by CPU 62 and in order to generate magnetic fields in X, Y and Z-directions having intensities (magnitudes and direction) specified by the program 60 at respective time point by the coils 53X, 53Y and 53Z, magnetic field intensity signals (data) specified by the program 60 are provided to the constant current power sources 57X, 57Y and 57Z of the power source unit 50 via the D/A converter 67. By controlling the relays 58X, 58Y and 58Z of the power source unit 50 via DIO 68, currents having predetermined magnitudes and directions are made to flow from the power source unit 50 to the coils 53X, 53Y and 53Z. The control unit 4 receives and checks an output of the magnetic sensor 56 by the uniform magnetic fields generated at a vicinity of the central portion C by the coils 53X, 53Y and 53Z via the relays 65X, 65Y and 65Z, the magnetic field measuring unit 64 and an A/D converter 66 and carries out a feedback control such that the magnetic field in correspondence with the output of the magnetic sensor 56 coincides with the magnetic field specified by the sequence control program 60 for generating the adjusting magnetic field at respective time point. Notation 63a designates a display portion such as a character liquid crystal display for displaying values of the magnetic fields of the three axes directions of X, Y and Z generated at the magnetic field generating unit.

A specific detailed explanation will be given of operation of the electronic azimuth meter adjusting system 1 comprising the magnetic field generating apparatus 2 and the electronic azimuth meter 3 constituted as described above in reference to FIG. 9 through FIG. 12.

Figure 9:
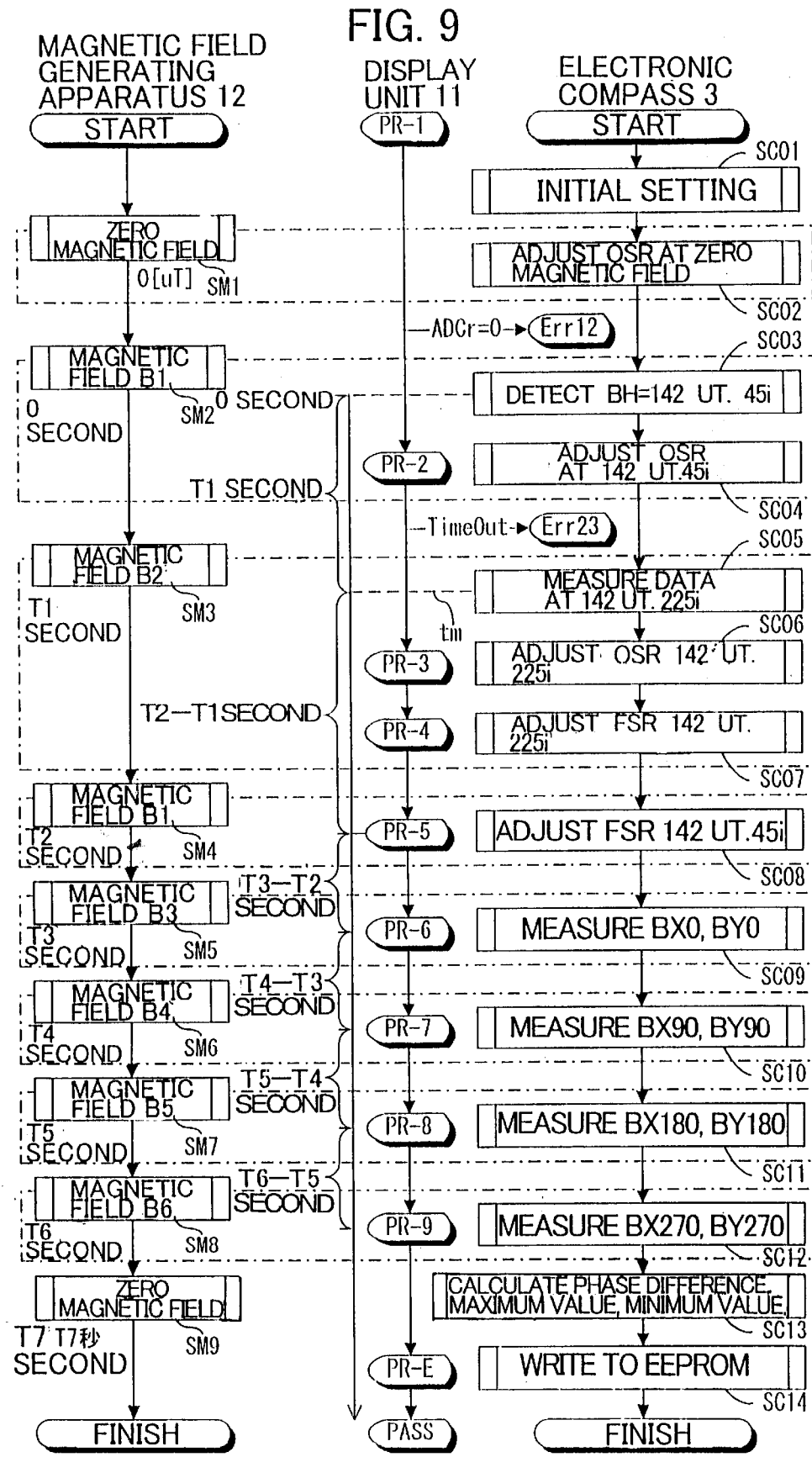
FIG. 9 is a flowchart showing an adjusting process in the electronic azimuth meter adjusting system of FIG. 1.

In FIG. 9 showing flowchart of a total of adjustment of the electronic azimuth meter 3, the adjusting magnetic field generating sequence is shown at left column of the magnetic field generating apparatus and the adjusting data acquisition sequence is shown at right column of the electronic compass. A display column at center indicates a portion of processings (display processing) in the data acquisition sequence of the electronic compass. The adjustment and acquisition sequence of FIG. 9 includes, in gross classification, a preadjusting stage before trigger, that is, before starting the sequence for adjustment, starting the sequence for adjustment or generating and starting a strong magnetic field for trigger or starting the sequence for adjustment by detecting the strong magnetic field for trigger, an offset adjusting stage and a sensitivity or span adjusting stage after starting the sequence for adjustment, a calibration stage by four azimuth magnetic fields, and a postadjusting stage constituted by calculating parameters for preservation $\delta x$, $\delta y$, $Vx_M$, $Vx_m$, $Vy_M$ and $Vy_m$ and storing thereof to EEPROM 24.

First, when starting of the sequence control program 60 for generating the magnetic field for adjustment of the magnetic field generating apparatus 2 is instructed by, for example, the touch panel 51, the program 60 issues an instruction for subjecting the region CR to zero magnetic field after a predetermined initial setting processing. At the zero magnetic field step SM1, the control unit 4a including the control board 63, controls the constant current power sources 57X, 57Y and 57Z such that X, Y, Z-direction components BMx, BMy and BMz of the magnetic field BM of the region CR detected by the magnetic field sensor 56 become 0, 0, 0. When the initial adjustment is carried out at a vicinity of Tokyo, the horizontal magnetic force of the geomagnetism is about 30 $\mu$T, the declination of the horizontal magnetic force relative to the north to the earth is about 6 degree to the west, the dip of the geomagnetism is about 50 degree and therefore, a magnetic field for canceling the geomagnetism is applied to the region CR by the coils 53X, 53Y and 53Z in accordance with the direction of the magnetic field generating unit 5. Further, the geomagnetism at a location of the initial adjustment is approximately known previously and therefore, the sequence control program 60 for generating the magnetic field for adjustment makes the magnetic field vary at vicinities of values thereof and makes the coils 53X, 53Y and 53Z generate the magnetic field for canceling the geomagnetism finally. Adjustment of the coil currents is normally achieved in a short period of time and therefore, the zero magnetic field is realized in about several seconds after instruction by the touch panel 51.

Meanwhile, the respective electronic azimuth meter 3 is mounted on the mounting base 5 along the guide portion 55 after instructing to start the adjustment mode in a factory (initial adjustment mode) by, for example, depressing the push button switch 31a of the respective electronic azimuth meter 3. The electronic azimuth meter 3 proceeds to an initial setting step SC01 of the adjustment mode constituting the preadjusting stage in accordance with depression of the switch 31a and sets the full scale rough adjustment values FSRx and FSRy in X-direction and Y-direction to 70, the full scale fine adjustment values FSFx and FSFy in X-direction and Y-direction to 2048 and the offset rough adjustment values OSR in X-direction and Y-direction to 128. The initial setting processing per se is finished in an extremely short period of time. When the initial setting processing SC01 is started, on the display screen 11a of the display unit 11 of the respective electronic azimuth meter 3, by the adjustment result monitoring unit 43 of the initial adjustment controlling unit 8, as shown by FIG. 2B, there is displayed "PR1" representing preset stage 1.

The electronic azimuth meter 3 proceeds to a second step when the preadjustment stage immediately after the initial setting step SC01, that is, a step SC02 of OSR adjustment (offset rough adjustment) under zero magnetic field. When the electronic azimuth meter 3 proceeds to step SC02, the region CR of the magnetic field generating unit 5 including magnetic parts such as the azimuth sensor (magnetic sensor) 6 and a battery of the electronic azimuth meter 3, is subjected to zero magnetic field. Step SC02 of the electronic azimuth meter 3 is the step of OSR adjustment (offset rough adjustment) under zero magnetic field. At step SC02, as shown by FIG. 10A, under the zero magnetic field, until a reset output value ADCr of the A/D converter 7 becomes positive, an OSR value is increased to increment by +1 from 128. According to an example of FIG. 10A, at OSR=129, the ADCr value under the zero magnetic field is negative, at OSR=130, the ADCr value under the zero magnetic field is positive and therefore, the OSR value is set to OSR=130. Incidentally, the abscissa shows magnetic field B in X-direction or Y-direction and the ordinate shows the ADC value (ADCs value in the case of set output, ADCr value in the case of reset output). The above-described processing is carried out with respect to X-direction and Y-direction under the data acquisition sequence control program, that is, under control of the sensitivity/offset control processing unit 41 of the initial adjustment controlling unit 8 of the electronic azimuth meter 3 and when ADCrx>0 and ADCry>0, the offset adjusting unit 37 holds the offset rough adjustment values OSRx and OSRy in X-direction and Y-direction at that occasion.

At step SC02, even when the OSR value is increased up to the maximum value 255, ADCr=0 remains unchanged (not ADCr>0), an error adjustment signal "Err12" is issued and displayed on the display screen 11a (FIG. 2A) of the display unit 11 of the respective electronic azimuth meter 3 as shown by FIG. 2D. With regard to the electronic azimuth meter 3 outputted with the error signal in this way, the sequence control is stopped while the error display remains unchanged and the operation proceeds to successive processings with regard to only remaining ones of the azimuth meters 3. Therefore, after the sequence control has been finished and the electronic azimuth meters 3 on the mounting base 54 are taken out from the base 54, the electronic azimuth meter 3 indicating the error display is dealt with as a failed product. Further, other various error checks are carried out at stages of middle of the sequence control and with regard to a failed product outputted with error display once by being caught by the error check, similarly, the sequence control is stopped at the stage of the error check and the error display although an explanation thereof is omitted in the specification. Further, in view of a probability of causing error, such kind of error is not actually caused with regard to two or more of the electronic azimuth meters 3.

When step SC02 has been finished, the electronic azimuth meter 3 is brought into a standby state under control of the data acquisition sequence control program. In the standby state, the magnetic sensors 13 and 14 alternately and repeatedly read the X-direction and the Y-direction magnetic field output values Vx and Vy in accordance with the time charts of FIG. 4B. The output values Vx and Vy of the magnetic sensors, are converted into ADCsx and ADCsy and ADCrx and ADCry by the A/D converter 7 and respective differences Diffx=ADCxs−ADCrx and Diffy=ADCsy−ADCry, are repeatedly compared with a reference value or a threshold Difth=200 by the data acquisition sequence control program of the electronic azimuth meter 3. At this stage, the differences Diffx and Diffy are values considerably smaller than the threshold Difth since the differences are output values under the zero magnetic field.

Next, the magnetic field generating apparatus 2 provides the power source unit 50 with a signal of generating magnetic field B1 under control of the sequence control program 60 for generating the magnetic field for adjustment to thereby generate magnetic field B1 by the coils 53 of the magnetic field generating unit 5 via the constant current power sources 57 and the relays 58 (step SM2). Further, in the following, applied magnetic field indicates a magnetic field to be added, in vector, to the magnetic field necessary for subjecting the region CR to the zero magnetic field and is different from total magnetic field generated by the coils 53. The magnetic field B1 is a magnetic field having a magnitude MagH equal to 142 $\mu$T, an azimuth angle MagD, that is, φ equal to 45 degree and dip MagF equal to 0 degree. Therefore, the magnetic field B1 is a magnetic field having X, Y and Z-direction components of (100 $\mu$T, 100 $\mu$T, 0 $\mu$T). In this case, the magnitude MagH of the magnetic field B1 is >>0 $\mu$T and >>30 $\mu$T and accordingly, the sensors can firmly detect application of the magnetic field sufficiently larger than the geomagnetism and different from the geomagnetism. Therefore, it is sufficient that the magnitude is, for example, about twice as much as or larger than the detectable maximum value of the geomagnetism or the magnitude may be larger than the maximum value by one digit. Rather, it is preferable that the magnitude is not so large in order to avoid a concern of impairing related element or apparatus.

When the magnetic field B1 is applied, the differences Diffx and Diffy of the outputs ADC values of the magnetic sensors 13 and 14 and the A/D converter 7 of the electronic azimuth meter 3 in the standby state, are immediately increased considerably in accordance with a large increase in the magnetic field B1 (FIG. 10B). As a result, the trigger detection processing unit 40 of the electronic azimuth meter 3, in other words, the data acquisition sequence control program of the electronic azimuth meter 3, compares the increased values of Diffx and Diffy with the threshold Difth=200 and starts a full-scale adjustment data acquisition sequence of the electronic azimuth meter 3 when the increased values are determined and detected to exceed the threshold Difth (step SC03). That is, the magnetic field B1 constitutes a trigger signal for starting the adjustment data acquisition sequence in the electronic azimuth meter 3. In this case, a time period until the full-scale adjustment sequence is started in the sequence control program of the electronic azimuth meter 3 after generating the magnetic field B1, is typically a short period of time in comparison with a processing time period of the adjustment sequence thereafter, and actually, generation of the magnetic field B1 and start of the full-scale adjustment sequence may be regarded to carry out simultaneously. Therefore, the time point is actually set to substantial start time point t=0 of the sequence of generating the magnetic field for adjustment and the sequence for acquiring data for adjustment, operation of the magnetic field generating apparatus 2 and operation of the azimuth meter 3 are synchronized and thereafter, the operations of the magnetic field generating apparatus 2 and the electronic azimuth meter 3 are actually synchronized although the two apparatus 2 and 3 are controlled sequence by respective timers or timepieces of their own.

When step SC03 has been finished, the sequence control program for acquiring data for adjustment of the electronic azimuth meter 3 proceeds to a first offset rough adjustment step SC04. At the first offset rough adjustment step SC04, under the magnetic field B1, the sensitivity/offset adjustment processing unit 41 of the initial adjustment controlling unit 8 increases to increment the offset rough adjustment values OSR by +1 until ADCr>1000 with regard to respectives of X-direction and Y-direction. An example of FIG. 10C shows that the ADCr value exceeds 1000 by increasing the OSR value set to 130 in step SC02 (FIG. 10A) up to 134. Further, at this step or step SC04, an adjustment is further carried out to satisfy a condition of ADCr<1400. As in the example, when at step SC02, the ADCr value under the zero magnetic field is made positive by increasing the OSR value, ADCr<1400 is automatically satisfied and accordingly, the operation is finished by only checking the condition, however, for example, when at previous step SC02 (FIG. 10A), the condition of ADCr>0 is satisfied from the start, there can be a case in which under the magnetic field B1, not only ADCr>1000 but also ADCr>1400. In such a case, at step SC04, under the magnetic field B1, with regard to the respectives of X-direction and Y-direction, the offset rough adjustment value OSR is increased to increment by −1 until ADCr<1400.

Further, when the operation proceeds to step SC04, display of the display unit 11 of the electronic azimuth meter 3 is changed from "PR1" to "PR2" under control of the adjustment result monitoring unit 43. Further, when the first OSR adjustment step SC04 is not finished during a predetermined time period T1, further particularly, when the electronic azimuth meter 3 does not proceed to the standby state even after elapse of the predetermined time period T1, the adjustment result monitoring unit 43 makes the display unit 11 display time out error "Err23". With regard to the electronic azimuth meter 3 displayed with the error, the sequence control thereafter is stopped as described above.

The adjusting magnetic field generating sequence control program 60 of the magnetic field generating apparatus 2 and the adjusting data acquisition sequence control program of the electronic azimuth meter 3, proceed to step SM3 of generating magnetic field B2 and step SC05 of measuring data after elapse of time period T1 from respective start time points. Since the programs are actually synchronized at start time point t=0, steps SM3 and SC05 started at time point of t=T1, are also naturally synchronized.

At step SM3 of generating magnetic field B2, the region CR is applied with magnetic field B2 having a direction inverse to that of the magnetic field B1 at step SM2, that is, the magnetic field B2 having the magnitude MagH of 142 $\mu$T, the azimuth angle MagD, that is $\phi$ of 225 degree and the dip MagF of 0 degree. Therefore, the magnetic field B2 is a magnetic field having ' X, Y an Z-direction components of (−100 $\mu$T, −100 $\mu$T, 0 $\mu$T).

Meanwhile, at the data measuring step SC05, the flip coils 15 and 16 of FIG. 4 are brought into a state of generating magnetized magnetic field in the forward direction, Vx and Vy in a set state are provided to the A/D converter 7 and ADCs values in X-direction and Y-direction, that is, ADCsx and ADCsy are alternately outputted from the A/D converter 7.

When the forward direction magnetized magnetic field setting has been finished at step SC05, immediately, the operation proceeds to an offset rough adjustment step SC06 controlled by the sensitivity/offset adjustment processing unit 41 of the electronic azimuth meter 3. At the offset rough adjustment step SC06, except that the magnetic field and the detected output are inverted, similar to step SC04, with regard to the respectives of X-direction and Y-direction, it is checked whether ADCs exceeds 1000 and offset rough adjustment value OSR (OSRx, OSRy) is increased to increment by +1 until ADCS>1000 (that is, ADCsx, ADCsy>1000) (FIG. 10D). In the illustrated example, the position of symmetry is shifted by −20 $\mu$T (for example, owing to influence of geomagnetism or magnetic properties of the magnetic sensors 13 and 14) and therefore, ADCs>1000 is automatically satisfied and therefore, the OSR value is held to be 134 set by step SC04, however, when center of symmetry is shifted to a positive side of the magnetic field, adjustment of the OSR value is carried out at step SC06. Further, according to the display unit 11, when the operation proceeds to step SC05, the display is changed to "PR3" under control of the adjustment result monitoring unit 43.

When the offset rough adjustment step SC06 has been finished, the adjustment data acquisition sequence control program of the electronic azimuth meter 3 successively proceed to full scale rough adjustment step or span rough adjustment step SC07 controlled by the sensitivity/offset adjustment processing unit 41 and changes display of the display unit 11 to "PR4" under control of the adjustment result monitoring unit 43.

At step SC07, the sensitivity adjusting unit 36 of the A/D converter 7 is adjusted by adjusting the full scale rough adjustment value FSR with regard to the respectives of X-direction and Y-direction such that an absolute value of the difference Diff, further particularly, 900<(ADCr−ADCs) <1300 is satisfied with respect to the set output ADCs and the reset output ADCr of the A/D converter 7 while generating magnetized magnetic fields alternately in the forward direction and the rearward direction by the flip coils 15 and 16 while shifting timings in X-direction and Y-direction as in the time charts of FIG. 4B. Further, FSR is set to 70 initially at initial setting step SC01. In the adjustment, further specifically, FSR is an amount multiplied by an inverse number thereof and therefore, the larger the FSR, the smaller the ADC value (therefore, the smaller the (ADCr−ADCs)) and therefore, for example, when (ADCr−ADCs) >1500, FSR is increased to increment by 5, when 1300< (ADCr−ADCs)≦1500, FSR is increased to increment by 1 and when (ADCr−ADCs)<900, FSR is reduced to decrement by 1.

Figure 11A:
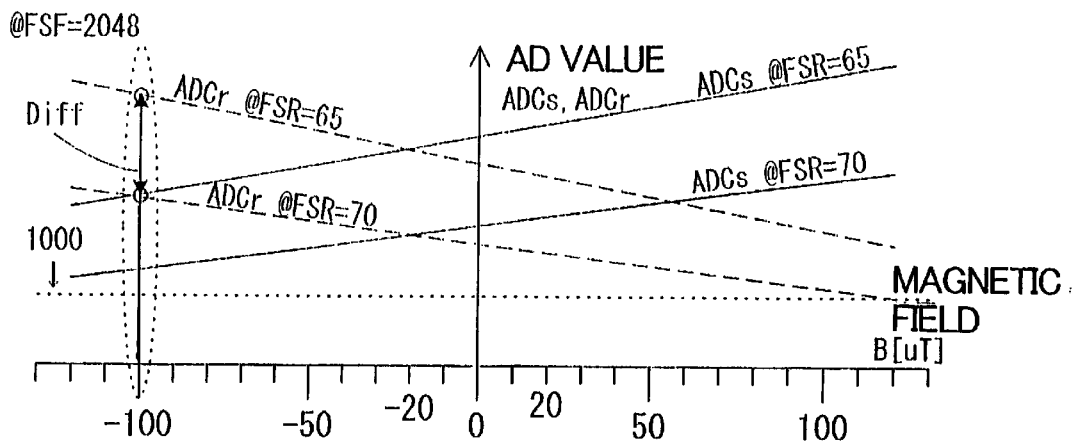
FIGS. 11A, 11B and 11C are schematic graphs for explaining middle several steps in the process of FIG. 9.

In an example shown by FIG. 11A, at FSR=70, (ADCr−ADCs) is smaller than 900 and therefore, by reducing FSR to decrement by 2 or 1 to reach FSR=65, the condition of 900<(ADCr−ADCs)<1300 is satisfied.

When time t=T2 after starting the sequence control is reached, the sequence control program 60 for generating magnetic field for adjustment of the magnetic field generating apparatus 2, proceeds to second magnetic field B1 generating step SM4 of generating again the magnetic field B1, the adjustment data acquisition sequence control program of the electronic azimuth meter 3, proceeds to second FSR adjustment step SC08 and changes display of the display unit 11 from "PR4" to "PR5" under control of the adjustment result monitoring unit 43. At the full scale rough adjustment step SC08, the full scale rough adjustment value FSR is adjusted such that (ADCs−ADCr)>900. According to a condition of the adjustment, when 700<(ADCs−ADCr) <900, FSR is reduced to decrement by 1 and when (ADCs−ADCr)<700, FSR is reduced to decrement by 2.

Figure 11B:
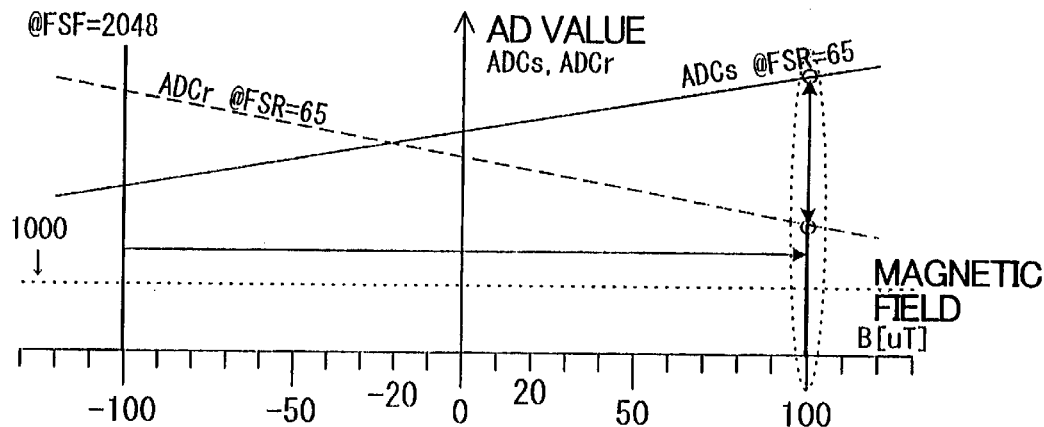

In the case of the example, a position of center of symmetry is shifted to the negative side of the magnetic field and therefore, as shown by FIG. 11B, the condition of 900 or more is automatically satisfied. However, when the center of symmetry is disposed on the positive side of the magnetic field, in accordance with the condition, there is carried out full scale rough adjustment (span or sensitivity adjustment) with respect to the sensitivity adjustment unit 36 of the A/D converter 7.

By steps SC07 and SC08, adjustment of the sensitivity adjusting unit 26 of the A/D converter 7, that is, the sensitivity or span adjustment of the A/D converter 7 is finished.

When time t=T3 after starting sequence control is reached, the sequence control program 60 for generating magnetic field for adjustment of the magnetic field generating apparatus 2, proceeds to magnetic field B3 generating step SM5 of generating magnetic field B3, the adjustment data acquisition sequence control program of the electronic azimuth meter 3 proceeds to Bx0, By0 measuring step SC09 and changes display of the display unit 11 from "PR5" to "PR6" under control of the adjustment result control unit 43.

Magnetic field produced at the region CR at step SM5 is magnetic field B3 having the magnitude MagH of 53.2 $\mu$T, the azimuth direction MagD, that is, $\phi$ of 0 degree and the dip MagF of 67 degree. The magnetic field B3 is added to the zero magnetic field, mentioned above. The magnetic field B3 corresponds to the horizontal magnetic force 20 $\mu$T of the geomagnetism at East Coast of the North portion of the United States.

Figure 11C:
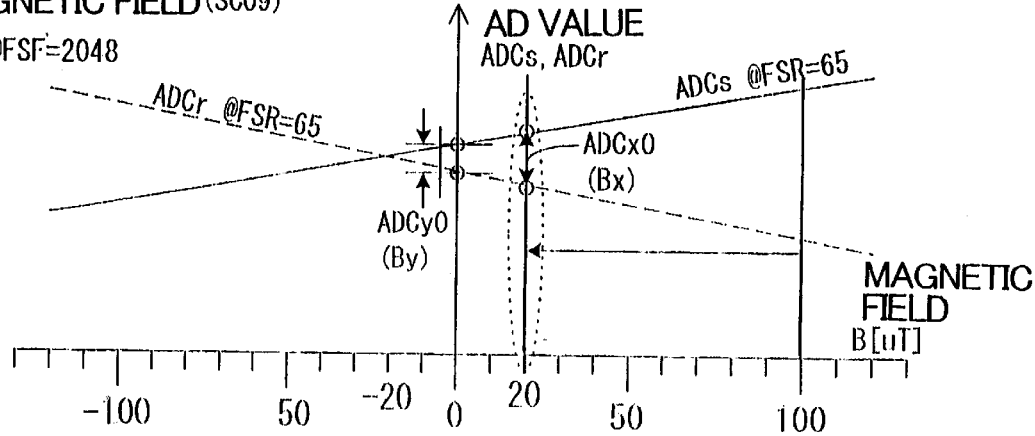

At corresponding measuring step SC09, the four azimuth data detection processing unit 8 of the electronic azimuth meter 3, samples ADC values of the A/D converter 7, that is, ADCx and ADCy under X-direction and Y-direction components of the magnetic field B3 (20 $\mu$T, 0 $\mu$T). Further particularly, as shown by FIG. 11C, Diffx=ADCsx−ADCrx is sampled as ADCx0, Diffy=ADCsy−ADCry under the magnetic field B3 is sampled as ADCy0 and provided ADOx0 and ADCy0 are temporarily stored in a predetermined work area as of the memory 26 ADC values at angle of 0 degree. Further, as is known from FIG. 11C, a shift in symmetry provides offset to the ADCx0 value at a position of 20 $\mu$T, further, assuming that the magnetic sensors and output characteristic of the A/D converter are similar, when the same graph is constituted with regard to X-direction and Y-direction, the shift in symmetry provides offset to the ADCy0 value at a position of 0 $\mu$T.

Further, for example, the sensitivity or span may be increased by further reducing the FSR value until ADCsx−ADCrx>1000 under X-direction magnetic field of 20 $\mu$T. However, in step SC09, after starting to measure ADCx0 and ADCy0 to be stored to the memory 26, the sensitivity, the span or the offset is not changed. Naturally, even in steps thereafter, the span and the offset are maintained constant.

When time t=T4 after starting the sequence control is reached, the sequence control program 60 for generating magnetic field for adjustment of the magnetic field generating apparatus 2, proceeds to magnetic field B4 generating step SM6 of generating magnetic field B4 and the adjusting data acquisition sequence control program of the electronic azimuth meter 3, proceeds to Bx90, By90 measuring step SC10 and changes display of the display unit 11 from "PR6" to "PR7" under control of the adjustment result monitoring unit 43.

The magnetic field B4 produced at the region CR at step SM6 is the same as the magnetic field B3 except that the azimuth direction MagD, that is, $\phi$ is changed from 0 degree to 90 degree, the magnitude MagH is 53.2 $\mu$T and the dip MagF is 67 degree. The magnetic field B4 is also added to the zero magnetic field, described above.

At corresponding measuring step SC10, similar to step SC09, as shown by FIG. 12A, the four azimuth data detection processing unit 42 of the initial adjustment controlling unit 8 of the electronic azimuth meter 3, samples Diffx and Diffy values (differences between outputs, that is, set outputs under normal direction magnetized magnetic field and outputs, that is, reset outputs under inverse direction magnetized magnetic field with regard to the respectives of X-direction and Y-direction) of the A/D converter 7 under X-direction and Y-direction components of the magnetic field B4 (0 $\mu$T, 20 $\mu$T) as ADCx90 and ADCy90. Provided ADCx90 and ADCy90 are temporarily stored in a predetermined work area of the memory 26 as ADC values at angle of 90 degree.

Similarly, when t=T5 after starting the sequence control is reached, the sequence control program 60 for generating magnetic field for adjustment of the magnetic field generating apparatus 2, proceeds to magnetic field B5 generating step SM7 of generating magnetic field B5 and the adjusting data acquisition sequence control program of the electronic azimuth meter 3, proceeds to Bx180, By180 measuring step SC11 and changes display of the display unit 11 from "PR7" to "PR8" under control of the adjustment result monitoring unit 43.

The magnetic field B5 produced at the region CR at step SM7 is the same as the magnetic field B4 except that azimuth direction MagD, that is, $\phi$ is changed from 90 degree to 180 degree, the magnitude MagH is 53.2 $\mu$T and the dip MagF is 67 degree. The magnetic field B5 is also added to the zero magnetic field, described above.

At corresponding measuring step SC11, the four azimuth data detection processing unit 42 of the initial adjustment controlling unit 8 of the electronic azimuth meter 3, samples Diffx and Diffy values of the A/D converter 7 under X-direction and Y-direction components of the magnetic field B5 of (−20 $\mu$T, 0 $\mu$T) as ADCx180 and ADCy180. Provided ADCx180 and ADCy180 are temporarily stored in a predetermined work area of the memory 26 as ADC values at angle of 180 degree.

Further, similarly, when time t=T6 after starting the sequence control is reached, the sequence control program 60 for generating magnetic field for adjustment of the magnetic field generating apparatus 2, proceeds to magnetic field B6 generating step SM8 of generating magnetic field B6 and the adjusting data acquisition sequence control program of the electronic azimuth meter 3, proceeds to Bx270, By270 measuring step SC12 and changes display of the display unit 11 from "PR8" to "PR9" under control of the adjustment result monitoring unit 43.

The magnetic field B6 produced at the region CR at step SM8 is the same as the magnetic field B5 except that the azimuth direction MagD, that is, $\phi$ is changed from 180 degree to 270 degree, the magnitude MagH is 53.2 $\mu$T and the dip MagF is 67 degree. The magnetic field B6 is also added to the zero magnetic field, described above.

At corresponding measuring step SC12, similar to steps SC09 through SC11, as shown by FIG. 12C, the four azimuth data detection processing unit 42 of the initial adjustment controlling unit 8 of the electronic azimuth meter 3, samples Diffx and Diffy values of the A/D converter 7 under X-direction and Y-direction components of the magnetic field B6 of (0 $\mu$T, −20 $\mu$T) as ADCx270 and ADCy270. Provided ADCx270 and ADCy270 are temporarily stored in a predetermined work area of the memory 26 as ADC values of the angle of 270 degree.

When data with regard to four azimuths ADCx0, ADCx90, ADCx180, ADCx270 and ADCy0, ADCy90, ADCy180 and ADCy270 are provided, the adjusting data acquisition sequence control program of the electronic azimuth meter 3, proceeds to phase difference and maximum/minimum values calculating step SC13, calculates the phase differences and the maximum and minimum value data $\delta x$, $Vx_M$ and $Vx_m$ and $\delta y$, $Vy_M$ and $Vy_m$ under control of the phase difference calculating unit 44 and the maximum value/minimum value calculating unit 45 based on Equation (3), Equation (4), Equation (5), Equation (6), Equation (7) and Equation (8) and changes display of the display unit 11 from "PR9" to "PRE" under control of the adjustment result monitoring unit 43. Further, here, in applying the calculation equations, ADCxα and ADCyα are reread as ADCxα=Vx(α) and ADCyα=Vy(α). Incidentally, α=0 degree, 90 degree, 180 degree or 270 degree.

When the calculation processing SC13 has been finished, the adjusting data acquisition sequence control program of the electronic azimuth meter 3, proceeds to writing step SC14 and writes a calculated result to the phase difference storing unit 34 and the maximum value/minimum value storing unit 35 of EEPROM 24. When the writing processing has been finished, at the display unit 11, as shown by FIG. 2C, "PASS" is displayed.

Meanwhile, when time t=T7 after starting the sequence control is reached, the operation proceeds to zero magnetic field step SM9, the sequence control program 60 for generating magnetic field for adjustment of the magnetic field generating apparatus 2 returns to the initial state of generating the magnetic field of subjecting the region CR to the zero magnetic field similar to step SM1 and the processing is finished. Thereby, the initial adjustment is finished. When successive four pieces of the electronic azimuth meters 3 are adjusted, the electronic azimuth meters 3 finished with the adjustment are detached from the guide portions 55 of the mounting base 54, new ones of the electronic azimuth meters 3 are mounted on the mounting bases 54 along the guide portions 55 and by depressing the adjustment mode switches 31a, the electronic azimuth meters 3 are made to proceed to the A/D converter initial setting step SC01. Further, the magnetic field generating apparatus 2 returns to step SM1 at step SM9 and therefore, the above-described processing may be repeated.

As described above, the sequences of adjusting the magnetic field generating apparatus 2 and the electronic azimuth meter 3 are started actually simultaneously by generating the magnetic field B1 for trigger between the magnetic field generating apparatus 2 and the electronic azimuth meter 3 and sensing the magnetic field B1 and are progressed actually in synchronism with each other by progressing the respective sequence control programs and therefore, there is not needed an electronic wiring between the electronic azimuth meter 3 and the outside magnetic field generating apparatus 2 at all and therefore, the electronic azimuth meter 3 is adjusted as in state of a finished product in final use thereof including a battery or a case back. Therefore, the initial adjustment or the calibration of the electronic azimuth meter 3 can be carried out properly to a maximum degree. Further, according to the electronic azimuth meter adjusting system 1, a plurality of pieces of the electronic azimuth meters 3 are arranged at the regions CR for generating magnetic field for adjustment and therefore, the plurality of pieces of electronic azimuth meters 3 can be adjusted simultaneously.

Further, although according to the above-described, an explanation has been given such that all output of the offset and magnetic field dependency and sensitivity (span) of the A/D converter 7 are dependent upon the offset characteristic and sensitivity characteristic of the A/D converter 7, even when cause of producing the offset is derived from any portion in a total detecting system from the MR element of the magnetic sensor to an output portion of the A/D converter 7, by adjusting the offset and adjusting the span as described above, the characteristic of the detecting system can be adjusted and a detecting system of the electronic azimuth meter 3 (from sensor to immediately before display unit) can be adjusted.

Further, although according to the above-described, an explanation has been given of the example in which only at t=0, generation of the magnetic field B1 is determined by the electronic azimuth meter 3, at the time point, time "t" of the sequence control timer of the electronic azimuth meter 3 is set to 0 and thereafter (t>0), the respective sequences of the magnetic field generating apparatus 2 and the electronic azimuth meter 3 are controlled under control of the respective timers of the magnetic field generating apparatus 2 and the electronic azimuth meter 3, when desired, in accordance with generation of a strong magnetic field after starting the sequence control or after elapse of a time period to some degree, the timing may be reset one time or a plurality of times or at the midst. For example, as shown by a broken line tm in FIG. 9, at t=T1 at which the magnetic field B2 is generated, again, a timing of proceeding to a successive processing may be set.

Further, when a battery of the electronic azimuth meter 3 is interchanged, the electronic azimuth meter 3 is brought into an adjustment mode in use and the maximum values $Vx_M$ and $Vy_M$ and the minimum values $Vx_m$ and $Vy_m$ during a time period of rotating the electronic azimuth meter 3 by one rotation by holding horizontally thereof, may be stored again to the maximum value/minimum value storing unit 35 under control of the maximum value/minimum value update control unit 12.

What is claimed is:

1. A method of adjusting an electronic azimuth meter comprising the steps of:

providing an electronic azimuth meter having a magnetic detector and a control circuit for performing an adjustment process in response to detection of a strong magnetic field having a magnitude larger than that of the Earth's geomagnetism;

generating a sequence of magnetic fields including the strong magnetic field in accordance with an adjusting magnetic field generating sequence to adjust the electronic azimuth meter;

performing an adjusting data acquisition sequence using the control unit of the electronic azimuth meter for acquiring output data of magnetic sensors of the magnetic detector for adjusting the electronic azimuth meter in synchronization with the magnetic field generating sequence while the electronic azimuth meter is disposed in a magnetic field region produced by the magnetic field generating apparatus; and starting the adjusting data acquisition sequence of the electronic azimuth meter by generating the strong magnetic field.

2. A method of adjusting an electronic azimuth meter according to claim 1; wherein the step of generating the sequence of magnetic fields includes the steps of generating magnetic fields in four azimuths.

3. A method of adjusting an electronic azimuth meter according to claim 1; wherein the step of generating the sequence of magnetic fields includes the step of generating magnetic fields used for adjusting a span and offset of an output of the magnetic detector of the electronic azimuth meter.

4. A method of adjusting an electronic azimuth meter according to claim 1; wherein the step of generating the sequence of magnetic fields includes the step of generating magnetic fields used for adjusting a span and offset of an output of an A/D converter connected to an output of magnetic sensors of the magnetic detector.

5. A system for adjusting an electronic azimuth meter, the system comprising:

a magnetic field generating apparatus for performing an adjusting magnetic field generating sequence by generating magnetic fields in a given sequence starting with a strong magnetic field having a magnitude larger than that of the Earth's geomagnetism, the strong magnetic field being used for starting a process of adjusting the electronic azimuth meter; and an electronic azimuth meter having a magnetic detector and a control unit for acquiring output data of the magnetic detector by performing a data acquisition sequence for adjusting the electronic azimuth meter in synchronization with the magnetic field generating sequence and starting the data acquisition sequence when the magnetic detector is arranged below a magnetic field produced by the magnetic field generating apparatus in the magnetic field generating sequence and senses the strong magnetic field.

6. In a system for adjusting an electronic azimuth meter: a magnetic field generating apparatus for generating a strong magnetic field having a magnitude larger than that of the Earth's geomagnetism; and a control unit for controlling the magnetic field generating apparatus to generate a sequence of magnetic fields starting with the strong magnetic field, the strong magnetic field being used to control the electronic azimuth meter to commence an adjusting data acquisition sequence in synchronization with the sequence of magnetic fields by acquiring output data of a magnetic detector.

7. In an electronic azimuth meter having a magnetic detector and a control unit for acquiring output data of the magnetic detector in accordance with a process of acquiring data for adjusting the electronic azimuth meter in synchronization with a sequence of generated magnetic fields: a control unit for starting the process of acquiring data for adjusting the electronic azimuth meter when a strong magnetic field having a magnitude larger than that of the Earth's geomagnetism representing a start of the sequence of magnetic fields is detected by the magnetic detector.

8. An electronic timepiece having a main body; a display; a timepiece movement; and an electronic azimuth meter; wherein the azimuth meter comprises the electronic azimuth meter according to claim 7.

9. An electronic azimuth meter according to claim 7; wherein the magnetic detector comprises X-direction and Y-direction magnetic sensors disposed in a main body for detecting magnetic field components in an X-Y plane; and further comprising a main body; a magnetic part forming at locations in the X-direction and the Y-direction magnetic sensors magnetic fields by being magnetized by the Earth's geomagnetism; and an azimuth calculating circuit for calculating the azimuth of the main body.

10. An electronic azimuth meter according to claim 9; wherein the magnetic part includes a battery arranged at a center of the main body.

11. An electronic azimuth meter according to claim 9; wherein the azimuth calculating circuit calculates the magnetic field components of the Earth's geomagnetism in the X and the Y directions and calculates the azimuth of the azimuth meter based on the magnetic field components of the Earth's geomagnetism.

12. An electronic azimuth meter according to claim 11; wherein the azimuth calculating circuit includes an azimuth data storing portion for storing the output values of the X-direction and the Y-direction magnetic sensors obtained at four azimuths comprised of north, south, east and west of the Earth's geomagnetism.

13. An electronic azimuth meter according to claim 12; further comprising a phase difference data storing portion for storing phase difference data in the X-direction and the Y-direction calculated from the detected magnetic field values of the X-direction and the Y-direction magnetic sensors with regard to four azimuths of east, west, south and north of the Earth's geomagnetism.

14. A method for adjusting an electronic azimuth meter comprising the steps of:

performing a magnetic field generating sequence by generating a sequence of magnetic fields used for adjusting the electronic azimuth meter, the sequence of magnetic fields commencing with generation of a strong magnetic field having a magnitude larger than that of the Earth's geomagnetism;

providing, within the strong magnetic field, an electronic azimuth meter having a magnetic detector and a control unit for performing a data acquisition and adjustment process in response to detection of the strong magnetic field, so that the control unit commences the data acquisition and adjustment process when the strong magnetic field is detected and the electronic azimuth meter is not electrically connected to a magnetic field generating apparatus which generates the sequence of magnetic fields.

15. A method for adjusting an electronic azimuth meter according to claim 14; wherein the data acquisition and adjustment process is performed in synchronization with the magnetic field generating sequence.

16. A method for adjusting an electronic azimuth meter according to claim 14; wherein the step of performing a magnetic field generating sequence includes the steps of generating magnetic fields in four azimuths.

17. A method for adjusting an electronic azimuth meter according to claim 14; wherein the step of performing a magnetic field generating sequence includes the step of generating magnetic fields used for adjusting a span and offset of an output of the magnetic detector of the electronic azimuth meter.

18. A method for adjusting an electronic azimuth meter according to claim 14; wherein the step of performing a magnetic field generating sequence includes the step of generating magnetic fields used for adjusting a span and offset of an output of an A/D converter connected to an output of magnetic sensors of the magnetic detector.

* * * * *